United States Patent
Mishler et al.

(10) Patent No.: US 11,435,536 B1
(45) Date of Patent: Sep. 6, 2022

(54) LATCHED OPTICAL FEEDTHROUGH SYSTEM FOR SUBSEA WELLHEAD PENETRATION USING SPHERICAL SEALS

(71) Applicant: Teledyne Instruments, Inc., Thousand Oaks, CA (US)

(72) Inventors: Kaley Mishler, Ocoee, FL (US); Alan McCleary, Lake Mary, FL (US); Richard Jones, Sanford, FL (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 17/388,901

(22) Filed: Jul. 29, 2021

(51) Int. Cl.
*G02B 6/40* (2006.01)
*G02B 6/44* (2006.01)
*E21B 33/038* (2006.01)

(52) U.S. Cl.
CPC .............. *G02B 6/40* (2013.01); *E21B 33/038* (2013.01); *G02B 6/4427* (2013.01)

(58) Field of Classification Search
CPC ........ G02B 6/40; G02B 6/4427; E21B 33/038
See application file for complete search history.

(56) References Cited

U.S. PATENT DOCUMENTS

| | | |
|---|---|---|
| 3,982,804 A | 9/1976 | Marechal |
| 4,203,640 A | 5/1980 | Bice et al. |
| 4,339,165 A | 7/1982 | Malsot et al. |
| 4,606,603 A | 8/1986 | Cairns |
| 4,616,900 A | 10/1986 | Cairns |
| 4,653,835 A | 3/1987 | Schulte et al. |
| 4,666,242 A | 5/1987 | Cairns |
| 4,673,242 A | 6/1987 | Logan et al. |
| 4,682,848 A | 7/1987 | Cairns et al. |
| 4,753,611 A | 6/1988 | Kobler |
| 4,773,725 A | 9/1988 | Ashman et al. |
| 4,795,359 A | 1/1989 | Alcock et al. |
| 4,865,563 A | 9/1989 | Ney et al. |
| 4,878,731 A | 11/1989 | Caron et al. |
| 4,929,184 A | 5/1990 | Emadi et al. |
| 4,948,377 A | 8/1990 | Cairns |

(Continued)

FOREIGN PATENT DOCUMENTS

| | | |
|---|---|---|
| CH | 680312 A5 | 7/1992 |
| DE | 615452 C | 7/1935 |

(Continued)

*Primary Examiner* — Andrew Jordan
(74) *Attorney, Agent, or Firm* — K&L Gates LLP

(57) ABSTRACT

A connector assembly includes a first and a second releasable and mateable connector. Each connector includes a front assembly composed of a manifold and a plurality of optical stems. Each manifold includes a plurality of inserts and a plurality of spherical seal assemblies. Each seal assembly is composed of a spherical ball, a ball dowel pin, and a ball actuator pin having a cam. Each spherical ball is configured to rotate about an axis defined by the two pins when the actuator pin cam traverses a groove fabricated in one of a plurality of guide rails disposed in the first connector. When the plurality of seal assemblies are in an open configuration, the optical stems of the first connector may slide through the inserts of the first connector, through the seals, and mate with the optical stems of the second connector within the inserts of the second connector.

18 Claims, 26 Drawing Sheets

(56) References Cited

U.S. PATENT DOCUMENTS

| | | | |
|---|---|---|---|
| 4,953,827 A * | 9/1990 | Araki | G02B 6/4485 |
| | | | 254/134.4 |
| 5,048,798 A * | 9/1991 | Araki | G02B 6/4485 |
| | | | 254/134.4 |
| 5,171,158 A | 12/1992 | Cairns | |
| 5,194,012 A | 3/1993 | Cairns | |
| 5,217,391 A | 6/1993 | Fisher, Jr. | |
| 5,234,350 A | 8/1993 | Marechal et al. | |
| 5,459,805 A * | 10/1995 | Foster | G02B 6/32 |
| | | | 385/35 |
| 5,645,438 A | 7/1997 | Cairns | |
| 5,685,727 A | 11/1997 | Cairns | |
| 5,738,535 A | 4/1998 | Cairns | |
| 5,899,765 A | 5/1999 | Niekrasz et al. | |
| 6,017,227 A | 1/2000 | Cairns et al. | |
| 6,315,461 B1 | 11/2001 | Cairns | |
| 6,332,787 B1 | 12/2001 | Barlow et al. | |
| 6,402,539 B1 | 6/2002 | Toth et al. | |
| 6,511,335 B1 | 1/2003 | Rayssiguier et al. | |
| 6,736,545 B2 | 5/2004 | Cairns et al. | |
| 6,839,493 B2 * | 1/2005 | Berto | G02B 6/32 |
| | | | 385/91 |
| 6,937,800 B2 * | 8/2005 | Cote | G02B 6/3897 |
| | | | 359/896 |
| 7,004,638 B2 | 2/2006 | Nicholson | |
| 7,056,179 B2 | 6/2006 | Courtney | |
| 7,097,515 B2 | 8/2006 | Siddiqi et al. | |
| 7,967,615 B2 | 6/2011 | Zacharevitz et al. | |
| 8,087,700 B2 | 1/2012 | Smith, III | |
| 8,192,089 B2 | 6/2012 | Cairns et al. | |
| 8,226,303 B2 | 7/2012 | Toth | |
| 8,971,152 B2 | 3/2015 | Chelminski | |
| 9,057,864 B2 * | 6/2015 | Kretschmar | G02B 6/506 |
| 9,077,099 B1 | 7/2015 | Hatcher et al. | |
| 9,097,861 B2 | 8/2015 | Hatcher et al. | |
| 9,246,261 B2 | 1/2016 | Hatcher et al. | |
| 9,391,392 B2 | 7/2016 | Ranalli et al. | |
| 9,556,686 B1 | 1/2017 | Krumpe | |
| 9,583,868 B2 | 2/2017 | McIntosh et al. | |
| 9,690,052 B2 | 6/2017 | Toth | |
| 9,847,593 B2 | 12/2017 | Nunner et al. | |
| 10,094,998 B2 * | 10/2018 | Lin | G02B 6/4422 |
| 10,693,251 B2 | 6/2020 | Ross et al. | |
| 11,056,024 B2 * | 7/2021 | Schade | G06F 21/00 |
| 2002/0140184 A1 | 10/2002 | Janoff et al. | |
| 2004/0165830 A1 * | 8/2004 | Cote | G02B 6/3897 |
| | | | 385/52 |
| 2005/0002617 A1 * | 1/2005 | Nicholson | G02B 6/3816 |
| | | | 385/53 |
| 2008/0205831 A1 | 8/2008 | Prel et al. | |
| 2009/0053931 A1 | 2/2009 | Islam | |
| 2011/0304135 A1 | 12/2011 | Chaize | |
| 2015/0036986 A1 * | 2/2015 | Kretschmar | G02B 6/506 |
| | | | 385/94 |
| 2016/0072219 A1 | 3/2016 | Christiansen et al. | |
| 2017/0005448 A1 * | 1/2017 | Williams | G02B 6/4428 |
| 2017/0204680 A1 | 7/2017 | Leismer et al. | |
| 2018/0059353 A1 * | 3/2018 | Lin | G02B 6/4422 |
| 2019/0066543 A1 * | 2/2019 | Schade | G06F 21/00 |
| 2019/0190190 A1 * | 6/2019 | Bourgeas | G02B 6/4459 |
| 2020/0080388 A1 | 3/2020 | Leismer et al. | |
| 2021/0083405 A1 | 3/2021 | Butler et al. | |

FOREIGN PATENT DOCUMENTS

| | | |
|---|---|---|
| EP | 0141746 A2 | 5/1985 |
| EP | 0538089 A1 | 4/1993 |
| EP | 1657576 B1 | 7/2008 |
| EP | 3123224 B1 | 5/2018 |
| GB | 2166261 A | 4/1986 |
| JP | 2000-505232 A | 4/2000 |
| JP | 2002-508535 A | 3/2002 |
| JP | 2004-246096 A | 9/2004 |
| JP | 6464185 B2 | 2/2019 |
| SU | 1356080 A1 | 11/1987 |
| WO | WO 96/22554 A2 | 7/1996 |
| WO | WO 97/33348 A1 | 9/1997 |

* cited by examiner

LATCHED OPTICAL FEEDTHROUGH SYSTEM FOR SUBSEA WELLHEAD PENETRATION USING SPHERICAL SEALS

BACKGROUND

A significant amount of oil and gas may be acquired from underground deposits located in deep water environments. The wells designed to extract such oil and gas may include a variety of casings inserted into the well hole. In addition to the casings allowing the liquid and gaseous material to be extracted from the well, the casings may also include any number of sensors to detect pressure, temperature, and other indicators of the well-hole environment. It is necessary to obtain the data from the sensors via communication channels, which may include communication wires or optical fibers. The communication channels may be separated from the well product—oil or gas—so that the well product may be directed through one series of pipes and/or tubes while the communication channels may be directed through a separate series of pipes and/or tubes.

A tubing hanger may be installed on the well head as a structure to separate the communication channels from the well product. In many cases, a Christmas tree may comprise an additional structure designed to mate with the tubing hanger. The Christmas tree may then include communication channels configured to attach to or contact the communication channels disposed in the tubing hanger. The communication channels within the Christmas tree are designed to interface with communication equipment above the deep water environment. In this manner, the well-hole environmental data may be transmitted from the bore hole through the tubing hanger to the Christmas tree for receipt by the communication equipment.

The Christmas tree is designed to reversibly mate with the tubing hanger so that the Christmas tree may be connected with the tubing hanger, or released from the tubing hanger, as needed. It may be recognized that the deep water environment may be hostile to a releasably connectable communication channel. The water may include a large number of particulates that may interfere with data transmission quality between the tubing hanger and the Christmas tree. The water temperature, either hot or cold, may also interfere with the connectivity between the tubing hanger communication channels and the Christmas tree communication channels. This may be especially the case in which the communication channels are fiber optic connectors.

It is also known that the tubing hanger is installed on the well head, which is disposed in the subsurface strata. Thus, the tubing hanger is in a fixed position relative to the Christmas tree when the end of the Christmas tree is connected to the tubing hanger. It may be recognized that the connection process may require great precision to assure that the Christmas tree is positioned exactly over the opening of the tubing hanger and at a proper orientation. Any deviation from a coaxial connection between the tubing hanger and the Christmas may result in damage to the tubing hanger.

Therefore, it is recognized that a tubing hanger and a Christmas tree require a type of mechanical connection capable of mating the communication channels of the two components in a deep water environment. Further, such a mechanical connection may be one to prevent debris from interfering with the optical connectivity between the two sets of communication channels. Further, the tubing hanger should include a type of feature to permit some amount of physical compliance during the mating procedure to prevent misalignment between or damage to the tubing hanger and/or the Christmas tree. Disclosed below is a type of connection system for use in a deep water oil or gas well environment that may address these issues.

SUMMARY

In one aspect, a connector assembly may include a first releasable and mateable connector and a second releasable and mateable connector. The first releasable and mateable connector may include a first front assembly, composed of a shell assembly, a shroud disposed at a distal end of the shell assembly, a first manifold disposed within an interior of the shell assembly, a plurality of first optical stems disposed within the interior of the shell assembly, a plurality of guide rails, a compression spring disposed within the shell assembly in mechanical communication with a distal end of the first manifold and a proximal end of the optical stem mount, and a first front face in mechanical communication with a distal face of the first manifold. A proximal end of each of the plurality of first optical stems is fixed within an optical stem mount, and a distal end of each of the plurality of first optical stems is slidably engaged within one of a plurality of first inserts. Each of the plurality of guide rails includes a cam groove. The first manifold further includes the plurality of first inserts and a plurality of first spherical seal assemblies. Each of the plurality of first spherical seal assemblies is composed of a first spherical seal ball, a first spherical seal ball dowel pin, a first spherical seal ball actuator pin, and a first actuator pin cam in mechanical communication with the spherical seal ball actuator pin. The second releasable and mateable connector may include a second front assembly, composed of a second manifold in mechanical communication with a center housing, and a plurality of second optical stems, in which a distal end of each of the plurality of second optical stems is fixed within one of a plurality of second inserts. The second manifold may be composed of the plurality of second inserts, a plurality of guide rail interfaces, and a plurality of second spherical seal assemblies. Each of the plurality of second spherical seal assemblies may be composed of a second spherical seal ball, a second spherical seal ball dowel pin, a second spherical seal ball actuator pin, and a second actuator pin cam in mechanical communication with the spherical seal ball actuator pin. Each of the first spherical seal balls of the plurality of first spherical seal assemblies is configured to rotate about a first axis defined by the first spherical seal ball dowel pin and the first spherical seal ball actuator pin when the first actuator pin cam traverses the cam groove of one of the plurality of guide rails. Each of the second spherical seal balls of the plurality of second spherical seal assemblies is configured to rotate about a second axis defined by the second spherical seal ball dowel pin and the second spherical seal ball actuator pin when the second actuator pin cam traverses the cam groove of the one of the plurality of guide rails.

In one aspect, a method of mating a first releasable and mateable connector and a second releasable and mateable connector, may include juxtaposing a first manifold of the first connector proximate to a second manifold of the second connector, inserting the second manifold of the second connector into a shroud of the first connector, contacting the first manifold with the second manifold, contacting a plurality of teeth of a latch collet of the first connector with a latch collet interface disposed in the second manifold of the second connector, impelling the second manifold against the first manifold, thereby displacing the first manifold in a proximal direction into a shell of the first connector, rotating each of a first plurality of spherical seals disposed in the first manifold, thereby permitting each of a first plurality of optical stem assemblies to travers each of a plurality of first spherical seal ball optical stem bore holes, rotating each of a second plurality of spherical seals disposed in the second manifold, thereby permitting each of a first plurality of optical stem assemblies to travers each of a plurality of second spherical seal ball optical stem bore holes; and contacting each of the plurality of first optical stem assemblies with each of a plurality of second optical stem assemblies.

The foregoing summary is illustrative only and is not intended to be in any way limiting. In addition to the illustrative aspects and features described above, further aspects and features will become apparent by reference to the drawings and the following detailed description.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings as follows.

FIGS. 13A, 15A, 17A, and 19A depict isometric views of the mating of a Christmas tree optical connector front assembly to a tubing hanger optical connector front assembly, according to one aspect of the present disclosure;

DETAILED DESCRIPTION

Figure 1:
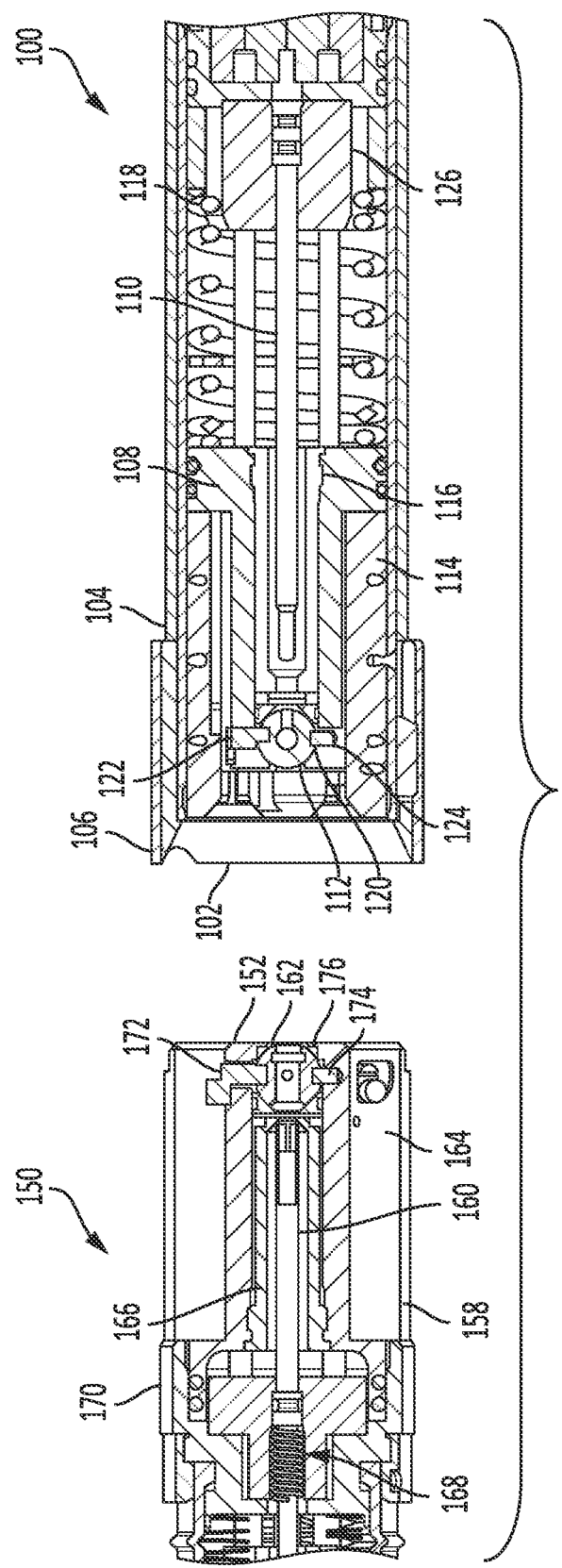
FIG. 1 depicts a cross-sectional view of a Christmas tree optical connector front assembly and a tubing hanger optical connector front assembly, according to one aspect of the present disclosure.

In the following detailed description, reference is made to the accompanying drawings, which form a part hereof. In the drawings, similar symbols and reference characters typically identify similar components throughout the several views, unless context dictates otherwise. The illustrative aspects described in the detailed description, drawings, and claims are not meant to be limiting. Other aspects may be utilized, and other changes may be made, without departing from the scope of the subject matter presented here.

Before explaining the various aspects of the present disclosure in detail, it should be noted that the various aspects disclosed herein are not limited in their application or use to the details of construction and arrangement of parts illustrated in the accompanying drawings and description. Rather, the disclosed aspects may be positioned or incorporated in other aspects, variations and modifications thereof, and may be practiced or carried out in various ways. Accordingly, aspects of the system and method in the present disclosure are illustrative in nature and are not meant to limit the scope or application thereof. Furthermore, unless otherwise indicated, the terms and expressions employed herein have been chosen for the purpose of describing the aspects for the convenience of the reader and are not to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

As disclosed above, a tubing hanger may be a device used to separate sensor communication channels from the products of a deep-water oil or gas well. The tubing hanger may be reversibly mated with a Christmas tree, which may include communication channels capable of transmitting the data from the tubing hanger to communication equipment above the deep water environment. Although the terms Christmas tree and tubing hanger are well established terms of art in deep-water well technology, it may be recognized that the systems, components, and methods disclosed herein are not limited solely to applications involving deep-water oil or gas extraction systems.

Such connector assemblies and methods may equally apply to any application in which communication channels may be reversibly mated under extreme environmental conditions. Thus, while the terms "Christmas tree" and "tubing hanger" or "Christmas tree connector" and "tubing hanger connector" may be used herein, it may understood that such terms are merely for convenience only, and are not limiting. Thus, systems and components associated with the term "Christmas tree optical connector" may equally apply to a "first releasable and mateable connector" while the term "tubing hanger optical connector" may equally apply to a "second releasable and mateable connector."

FIG. 1 depicts a cross-sectional view of a Christmas tree optical connector front assembly 100. The Christmas tree optical connector front assembly 100 is composed of a cylindrical shell assembly 104 that includes a shell assembly shroud 106 at a distal end. The distal end of the Christmas tree optical connector front assembly 100 is composed of a Christmas tree optical connector front face 102. Disposed within the Christmas tree optical connector front assembly 100 is a Christmas tree optical connector manifold 108, which is in mechanical communication with the Christmas tree optical connector front face 102. Attached to the inner wall of the cylindrical shell assembly 104 are one or more Christmas tree optical connector guide rails 114. The Christmas tree optical connector manifold 108 may house multiple structures including one or more Christmas tree optical connector spherical seal assemblies 112 and one or more Christmas tree optical connector inserts 116. An interior space of the cylindrical shell assembly may be filled with an amount of a compensating fluid such as an oil or a gel.

The Christmas tree optical connector front assembly 100 may also include one or more Christmas tree optical connector optical stems 110. The Christmas tree optical connector optical stems 110 are fabricated to stabilize and protect optical fibers that may act as communication channels from the Christmas tree optical connector to the communication equipment above the deep water environment. The Christmas tree optical connector optical stems 110 may terminate at a distal end in an optical stem assembly. The optical stem assembly may be placed in optical communication with a similar optical stem assembly on a distal end of a tubing hanger optical connector optical stem 160. The distal end of each of the Christmas tree optical connector optical stems 110 may be slideably disposed within an equivalent Christmas tree insert 116. The proximal ends of the Christmas tree optical connector optical stems 110 may be affixed within a Christmas tree optical connector optical stem mount 126, fabricated to stabilize the proximal ends of the Christmas tree optical connector optical stems 110. It may be noted that the compensating fluid disposed within the interior space of the Christmas tree optical connector shell assembly may have optical properties that are matched to the optical properties of the optical stem assemblies. Thus, when the Christmas tree optical connector optical stem assemblies are coated with the fluid, the fluid provides for termination of the optical signal when the connectors are unmated. When mated, the fluid may be forced out of the connecting space between the Christmas tree optical connector optical stem assemblies and the equivalent tubing hanger optical connector optical stem assemblies. The compensating fluid may then simply provide for pressure and/or temperature compensation and may not enhance optical performance between the mated assembly halves.

The Christmas tree optical connector manifold 108 is configured to slide along an inner surface of the Christmas tree optical connector shell assembly 104. In some aspects, the Christmas tree optical connector manifold 108 may include one or more Christmas tree optical connector guide rail interfaces, which may slidably engage one or more Christmas tree optical connector guide rails 114. Christmas tree optical connector compression spring 118 establishes a biasing force to maintain the Christmas tree optical connector manifold 108 at the distal end of the Christmas tree optical connector shell assembly 104. However, under suitable force, during the mating process—see below—the Christmas tree optical connector manifold 108 may be driven in a proximal direction until a proximal end of the Christmas tree optical connector manifold 108 contacts a distal end of the Christmas tree optical connector optical stem mount 126.

As disclosed above, the Christmas tree optical connector manifold 108 also includes one or more Christmas tree optical connector spherical seal assemblies 112. Each of the Christmas tree optical connector spherical seal assemblies 112 includes a Christmas tree optical connector spherical seal ball 120. When the Christmas tree optical connector spherical seal ball 120 is rotated into an open position, an Christmas tree optical connector optical stem connector assembly may traverse through a seal ball optical stem bore hole. Each of the Christmas tree optical connector spherical seal assemblies 112 further includes a Christmas tree optical connector spherical seal actuator pin 122 and a Christmas tree optical connector spherical seal dowel pin 124, each attached to opposing sides of the Christmas tree optical connector spherical seal ball 120. The Christmas tree optical connector spherical seal actuator pin 122 and the Christmas tree optical connector spherical seal dowel pin 124 define a rotational axis, about which the Christmas tree optical connector spherical seal ball 120 may rotate during actuation. FIGS. 21A-D below depict a mechanism by which the Christmas tree optical connector spherical seal ball 120 rotates during the mating process of the Christmas tree optical connector front assembly with the tubing hanger optical connector front assembly.

FIG. 1 also depicts a cross-section view of a tubing hanger optical connector front assembly 150. The tubing hanger optical connector front assembly 150 includes a tubing hanger optical connector manifold 158 affixed, at a proximal end, to a distal end of a tubing hanger optical connector center housing 170. The distal end of the tubing hanger optical connector manifold 158 includes a tubing hanger optical connector front face 152. The tubing hanger optical connector manifold 158 includes one or more tubing hanger optical connector spherical seal assemblies 162 and one or more tubing hanger optical connector inserts 166. Additionally, the tubing hanger optical connector manifold 158 includes one or more tubing hanger optical connector guide rail interfaces 164. During the mating process, each of the Christmas tree optical connectors guide rails 114 may slidably engage an equivalent tubing hanger optical connector guide rail interface 164.

The tubing hanger optical connector front assembly 150 further includes one or more tubing hanger optical connector optical stems 160. Each tubing hanger optical connector optical stem 160 may be disposed within one of the tubing hanger optical connector inserts 166. The tubing hanger optical connector optical stems 160 function similarly to the Christmas tree optical connector optical stems 110. Thus, each of the tubing hanger optical connector optical stems 160 forms a cladding to support and protect an optical fiber that may be connected to a sensor or sensing fiber length within the well-bore. One or more optical fibers from the sensor may transmit data such as sensor data through the tubing hanger to the one or more optical stems 160. When the distal connector of a tubing hanger optical connector optical stem 160 is placed in optical communication with a distal connector of a Christmas tree optical connector optical stem 110, the data from the well-bore sensors may be transmitted to the optical equipment above the well-head. Each of the tubing hanger optical connector optical stems 160 is mounted within a tubing hanger optical connector optical stem spring 168 to provide compliance during the mating process and ensure that a compressive contact force, which maintains the optical path at the interface, is present between the mated stem pair.

The tubing hanger optical connector spherical seal assemblies 162 are similar to the Christmas tree optical connector spherical seal assemblies 112. Each tubing hanger optical connector spherical seal assembly 162 includes a tubing hanger optical connector spherical seal ball 176. Each of the tubing hanger optical connector spherical seal balls 176 is in mechanical communication with a tubing hanger optical connector spherical seal actuator pin 172 and a tubing hanger optical connector spherical seal dowel pin 174. The tubing hanger optical connector spherical seal actuator pin 172 and tubing hanger optical connector spherical seal dowel pin 174 define a rotational axis for the tubing hanger optical connector spherical seal spherical seal ball 176. When the tubing hanger optical connector spherical seal ball 176 is rotated into an open position, a tubing hanger optical connector spherical seal ball bore hole is aligned to receive the optical assembly of the Christmas tree optical connector optical stem 110. FIGS. 21A-D below also depicts the mechanism by which the tubing hanger optical connector spherical seal ball 176 rotates during the mating process of the Christmas tree optical connector front assembly with the tubing hanger optical connector front assembly.

Figure 2:
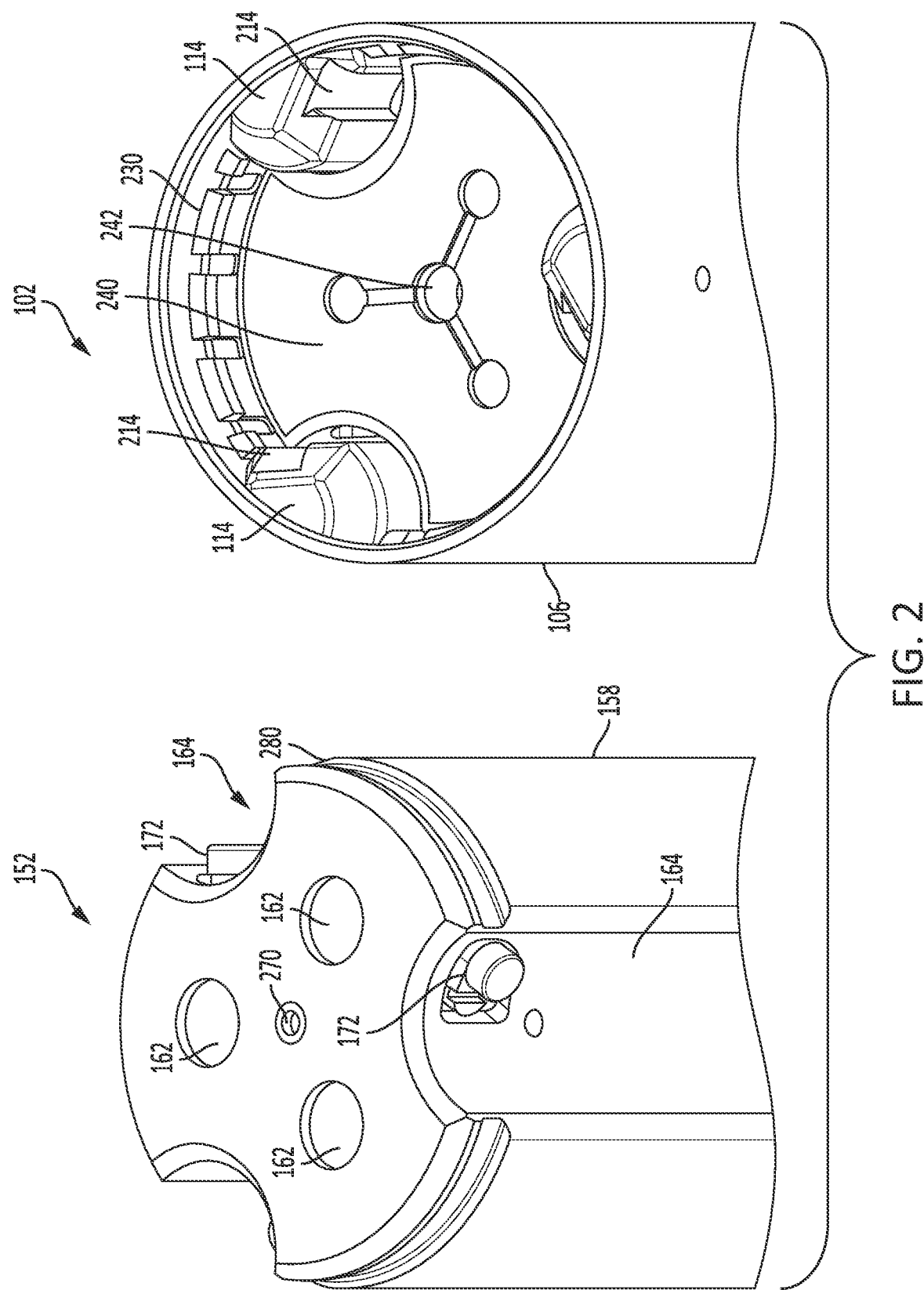
FIG. 2 depicts an isometric view of a front face of a Christmas tree optical connector front assembly and a front face of a tubing hanger optical connector front assembly, according to one aspect of the present disclosure.

FIG. 2 depicts an isometric view of a front face 102 of a Christmas tree optical connector front assembly and a front face 152 of a tubing hanger optical connector front assembly, respectively. The view depicting the Christmas tree optical connector front face 102 is a view looking into the shroud 106 of the Christmas tree optical connector when the Christmas tree optical connector is not in contact with the tubing hanger optical connector. Depicted in this view are the distal ends of the Christmas tree optical connector guide rails 114, showing entrances to Christmas tree optical connector cam grooves 214. Also depicted are the distal ends of the Christmas tree optical connector latch collets 230, particularly displaying the latch collet teeth. The distal surface of the Christmas tree optical connector manifold (not shown in this figure) is in mechanical communication with a Christmas tree optical connector face seal 240. In the center of the Christmas tree optical connector face seal 240 is a compensating fluid fill port 242, through which the compensating fluid may be introduced into the interior of the Christmas tree optical connector front assembly. Although FIG. 2 depicts the compensating fluid fill port 242 as being in the center of the Christmas tree optical connector face seal 240, it may be recognized that the compensating fluid fill port 242 may be located at any position of the Christmas tree optical connector face seal 240 provided that the location does not interfere with the actions of any of the components of the Christmas tree optical connector or the tubing hanger optical connector during the mating procedure.

Depicted in the tubing hanger optical connector front face 152 is the distal surface of the tubing hanger optical connector manifold 158. In particular are shown the tubing hanger optical connector spherical seal assemblies 162 (in a closed position) and a check valve face 270 disposed in the center of the distal surface of the tubing hanger optical connector manifold 158. In one aspect, the Christmas tree optical connector compensating fluid port 242 may be positioned opposite the check valve face 270 when the Christmas tree optical connector front face 102 is positioned proximate to the tubing hanger optical connector front face 152. However, the location of the Christmas tree optical connector compensating fluid port 242 at the Christmas tree optical connector front end is purely arbitrary. At a distal edge of the tubing hanger optical connector front face 152 is a tubing hanger optical connector latch collet interface 280. The latch collet interface 280 is configured to receive and retain the teeth of the Christmas tree optical connector latch collet 230 when the mating process between the Christmas tree optical connector and the tubing hanger optical connector begins.

FIG. 2 also depicts the tubing hanger optical connector guide rail interfaces 164, which are fabricated in the side of the tubing hanger optical connector manifold 158. As disclosed above, the guide rail interfaces 164 are configured to slidably engage the guide rails 114 during the mating process. It may be observed as well that cams of the tubing hanger optical connector actuator pins 172 extend into the guide rail interfaces 164. During the mating process, the tubing hanger optical connector actuator pin cams may enter and traverse the Christmas tree optical connector cam grooves in the guide rails.

Figure 3:
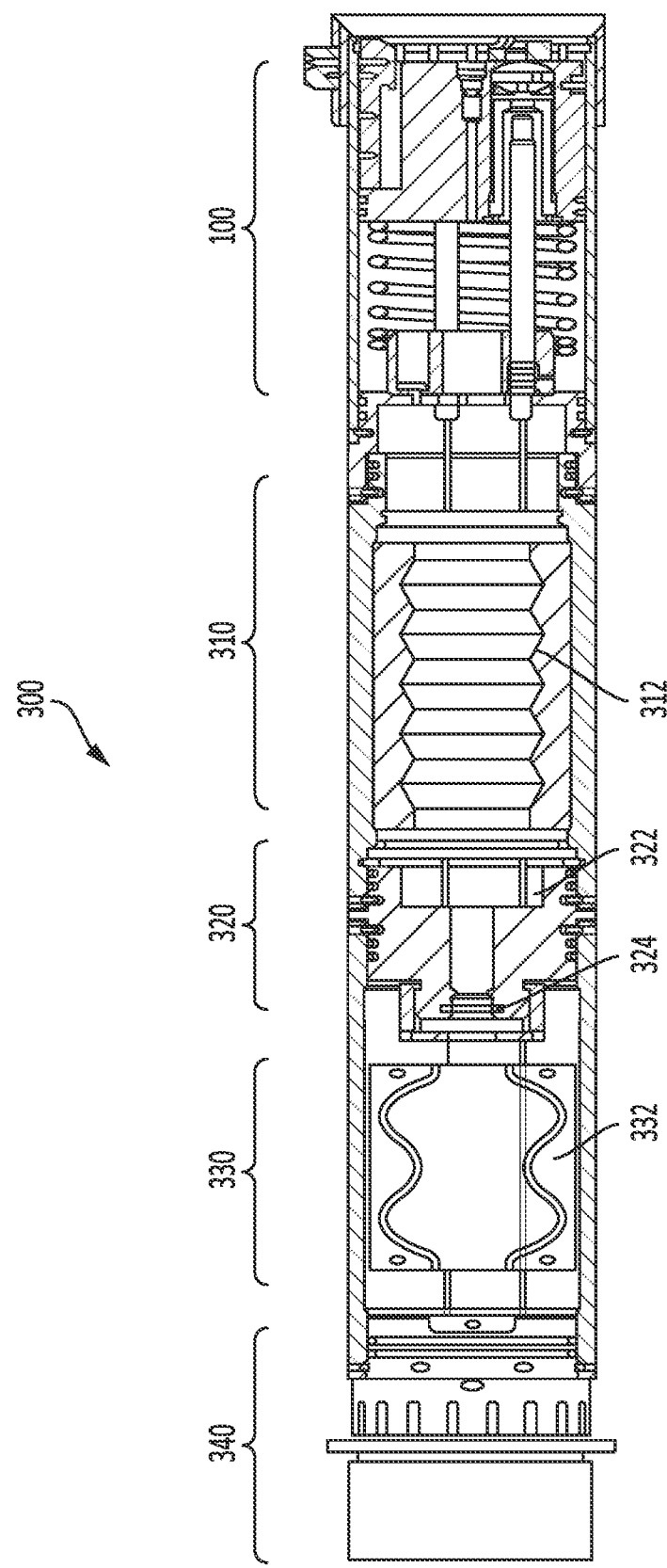
FIG. 3 depicts a cross-sectional view of a Christmas tree optical connector assembly, according to one aspect of the present disclosure.

FIG. 3 illustrates a cross section view of the Christmas tree optical connector assembly 300. The distal end of the Christmas tree optical connector assembly 300 comprises the Christmas tree optical connector front assembly 100 as depicted in FIG. 1. The Christmas tree optical connector front assembly 100 is in physical communication with a distal end of a Christmas tree optical connector pressure compensation section 310. The Christmas tree optical connector pressure compensation section 310 includes a Christmas tree optical connector compensation bladder 312. As noted above, an amount of compensating fluid is retained in the interior space of the Christmas tree optical connector front assembly 100. This fluid further enters an interior space of the Christmas tree optical connector pressure compensation section 310, and is retained in the Christmas tree optical connector compensation bladder 312 as a reservoir. The fluid and the Christmas tree optical connector compensation bladder 312 are used to compensate for changes in pressure and temperature of the Christmas tree optical connector assembly 300 due to the deep-water and well-head interface environments.

The proximal end of the Christmas tree optical connector pressure compensation section 310 may be in physical communication with a distal end of a Christmas tree optical connector penetrator assembly 320. Components of the Christmas tree optical connector penetrator assembly 320 may include a penetrator locking nut 322 and a penetrator 324. A proximal end of the Christmas tree optical connector compensation bladder 312 is sealed against the penetrator locking nut 322. The penetrator assembly 320 is designed as a transitional structure between the Christmas tree optical connector pressure compensation section 310 and the Christmas tree proximal end interface 340. In particular, the optical fibers that are stabilized in the Christmas tree optical connector optical stems (see 110 in FIG. 1) traverse the Christmas tree optical connector compensation bladder 312 and the penetrator 324. The optical fibers in the penetrator 324 are sealed with a material, such as an epoxy, to form a fluid-tight seal. A separate amount of a compensation fluid, which may lack necessary optical qualities, is disposed in the fiber management assembly 330 and the Christmas tree proximal end interface 340. Thus, the sealing material within the penetrator 324 serves to stabilize the optical fibers traversing therethrough as well as prevent mixing of the amount of compensating fluid in the more proximal sections (the fiber management assembly 330 and the Christmas tree proximal end interface 340) with the compensating fluid in the distal sections (the Christmas tree optical connector pressure compensation section 310 and the Christmas tree optical connector front assembly 100).

The proximal end of the penetrator assembly 320 is in mechanical communication with a distal end of a fiber management assembly 330. The fiber management assembly 330 includes a fiber management tray 332 on which the optical fiber is wound for stability purposes. A proximal end of the fiber management assembly 330 is in mechanical association with a distal end of a Christmas tree proximal end interface 340 The Christmas tree proximal end interface 340 is a termination for additional components configured to conduct the optical fibers to the communication equipment above the deep water environment. In this manner, the Christmas tree optical connector assembly 300 is configured to protect the optical fibers and permit the well bore data to be transmitted from the tubing hanger optical connector.

Figure 4A:
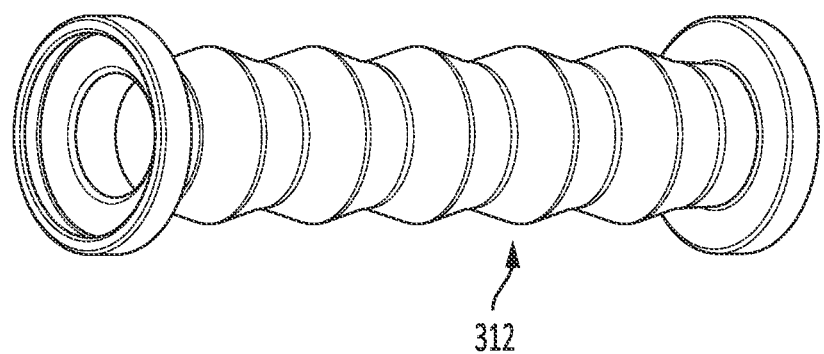
FIG. 4A depicts an isometric view of a Christmas tree optical connector compensation bladder, according to one aspect of the present disclosure.
Figure 4B:
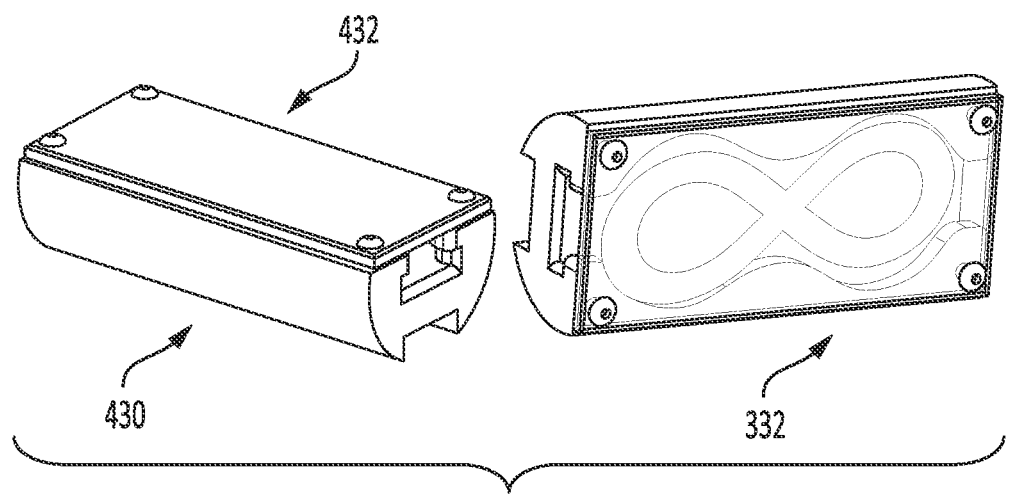
FIG. 4B depicts isometric views of components of a Christmas tree optical connector fiber management assembly, according to one aspect of the present disclosure.
Figure 4C:
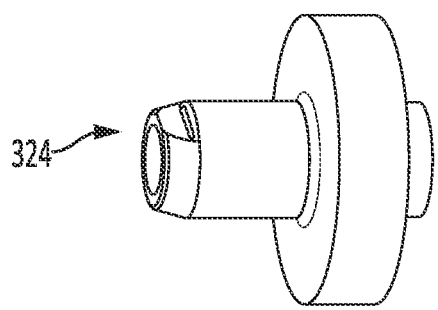
FIG. 4C depicts an isometric view of a Christmas tree optical connector penetrator, according to one aspect of the present disclosure.

FIGS. 4A,B, and C illustrate some specific components of the Christmas tree optical connector assembly (300 of FIG. 3). Thus, FIG. 4A depicts an isometric view of the Christmas tree optical connector compensation bladder 312. FIG. 4B depicts a fiber management assemblage 430 which may be disposed within the fiber management assembly 330. The fiber management assemblage 430 is composed of the fiber management tray 332 and a fiber management tray lid 432. The fiber management assemblage 430 may help secure and protect the optical fibers. FIG. 4C depicts the Christmas tree optical connector penetrator 324. A bore hole is observable in the penetrator 324 through which the optical fibers may run. Once the optical fibers are placed in the penetrator 324, the penetrator bore hole may be filled with a material, such as an epoxy, to seal and protect the optical fibers.

Figure 5:
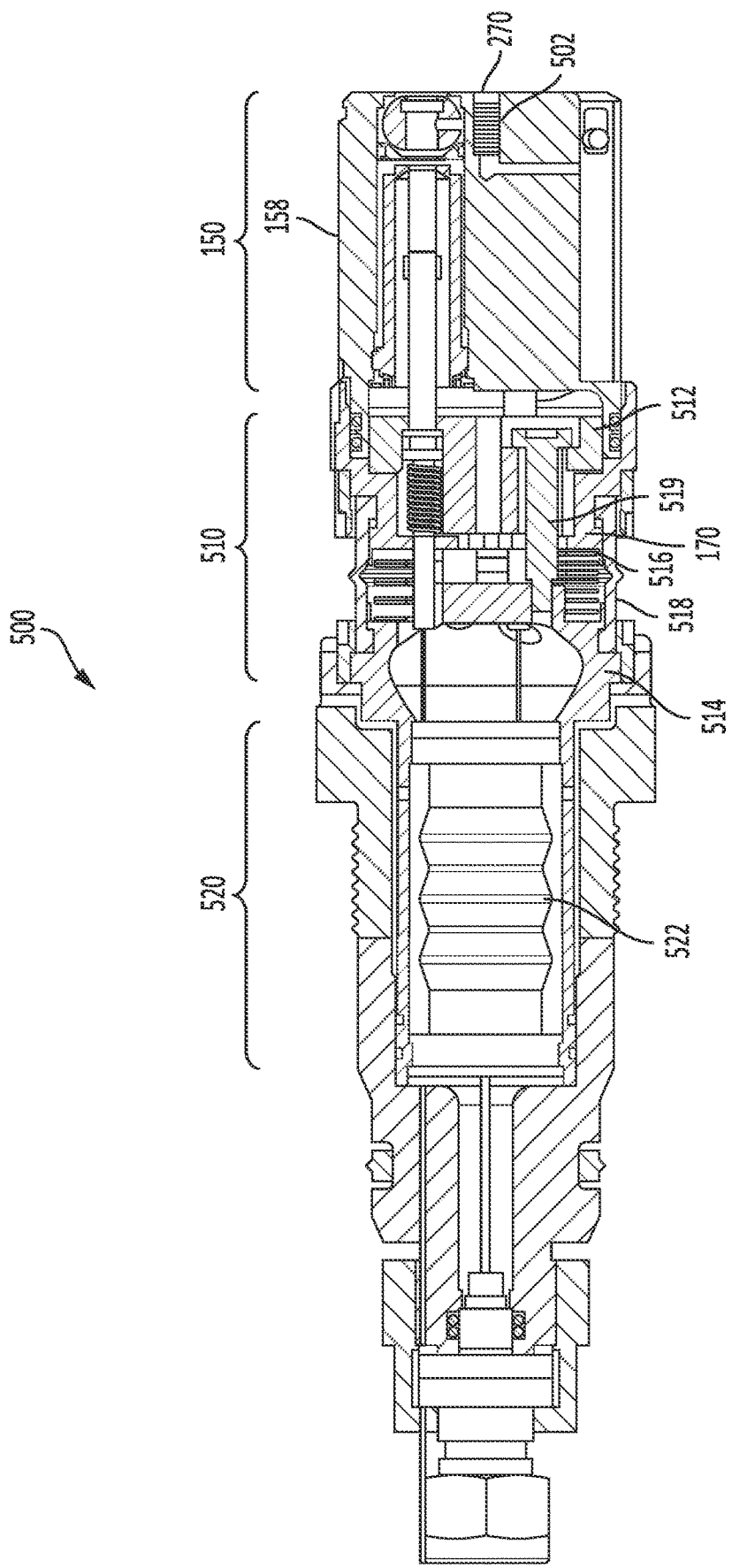
FIG. 5 depicts a cross-section view of a tubing hanger optical connector assembly, according to one aspect of the present disclosure.

FIG. 5 depicts a cross-section view of a tubing hanger optical connector 500. As previously discussed, the distal end of the tubing hanger optical connector 500 comprises the tubing hanger optical connector front assembly 150. The tubing hanger optical connector front assembly includes the tubing hanger optical connector manifold 158, which may include a tubing hanger optical connector check valve assembly 502. The check valve face 270 is disposed on the distal face of the tubing hanger optical connector manifold 158. The proximal end of the tubing hanger optical connector manifold 158 is in mechanical communication with the tubing hanger optical connector center housing 170.

The tubing hanger optical connector center housing 170 is in mechanical communication with the components comprising a misalignment compliance assembly 510. It may be understood that the tubing hanger is in mechanical communication with the casings that compose the well bore-hole. Consequently, the tubing hanger is spatially fixed. The Christmas tree is attached to the tubing hanger, and may be brought into position by any suitable means including a platform mounted crane. As a result, the connector end of the Christmas tree must be moved into position in order to properly mate with the tubing hanger. Since the Christmas tree must be moved into position, there is a possibility that the optical connector end of the Christmas tree is not positioned exactly coaxial with respect to the optical connector end of the tubing hanger. Therefore, some amount of mechanical compliance in the position of the optical connector end of the tubing hanger may be required during the mating process. Thus, a misalignment compliance assembly 510 may be required to assure that there is sufficient compliance in the tubing hanger optical connector end to facilitate the mating of the tubing hanger optical connector and the Christmas tree optical connector. Such a compliance assembly may further prevent the application of potentially damaging mechanical stress to the tubing hanger optical connector during the mating process.

The components of the tubing hanger optical connector misalignment compliance assembly 510 may include a stem retaining plate 512 in mechanical communication with the tubing hanger optical connector center housing 170. The retaining plate 512 may be in mechanical communication with a distal portion of a misalignment back housing 514. The retaining plate 512 may be compliantly fixed to the back housing 514 by means of one or more shoulder bolts 519. A proximal side of the stem retaining plate 512 may be disposed opposite a distal side of the back housing 514, separated by a misalignment compliance spring 516. A misalignment outer bladder 518 may surround the compliance spring 516, thereby protecting the compliance spring 516 and the other interior components of the compliance assembly 510 from exposure to the environment.

Proximal to the misalignment compliance assembly 510 is a tubing hanger optical connector compensating bladder housing 520. The compensating bladder housing 520 may include a compensating bladder 522. A proximal portion of the misalignment back housing 514 may be disposed within the compensating bladder housing 520. In some aspects, the compensating bladder 522 may be disposed within the proximal portion of the misalignment back housing 514. The compensating bladder 522 may also be filled with a fluid to compensate for pressure and temperature changes in the compensating bladder housing 520 and the misalignment compliance assembly 510.

Figure 6:
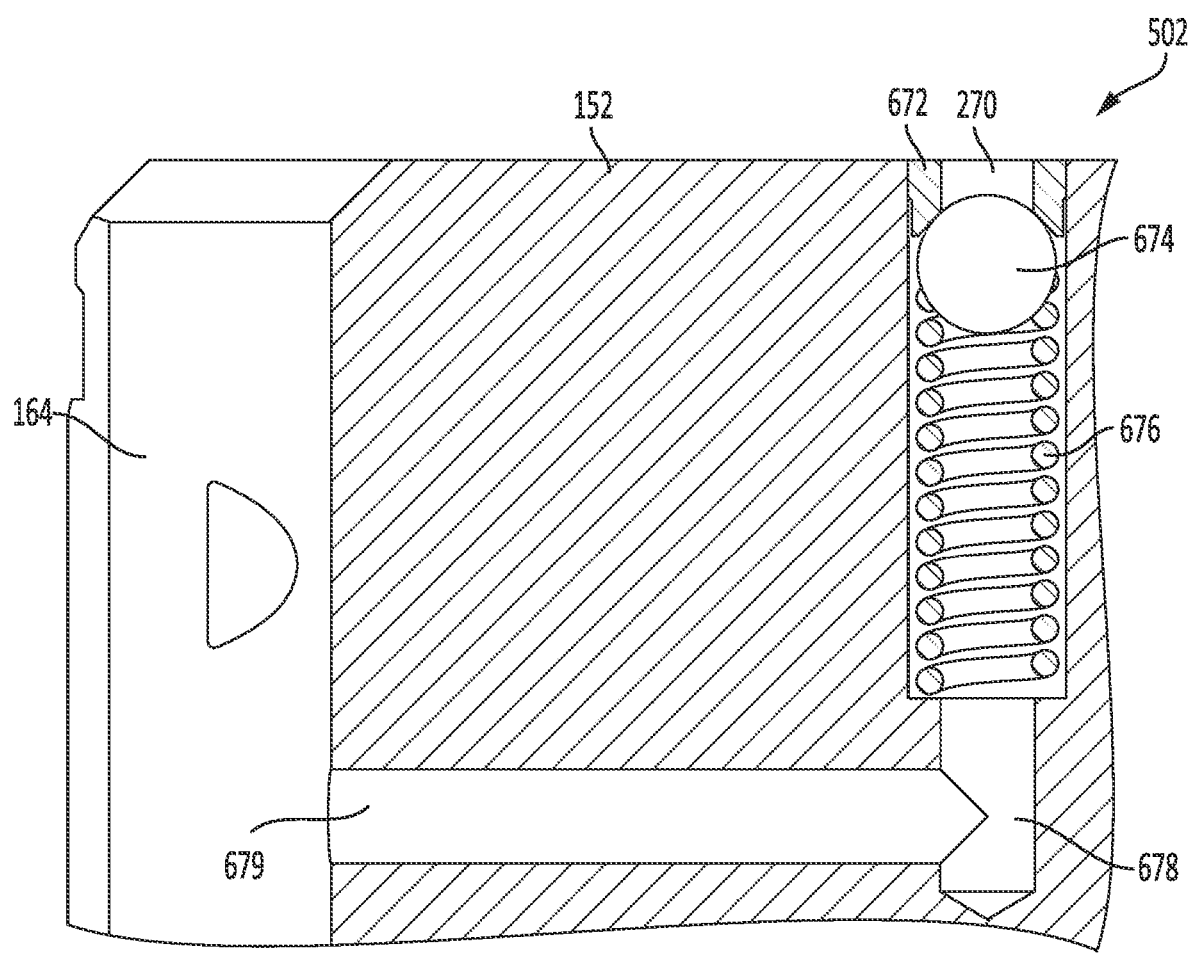
FIG. 6 depicts a cross-section view of a tubing hanger optical connector manifold depicting a tubing hanger optical connector check valve assembly, according to one aspect of the present disclosure.
Figure 7:
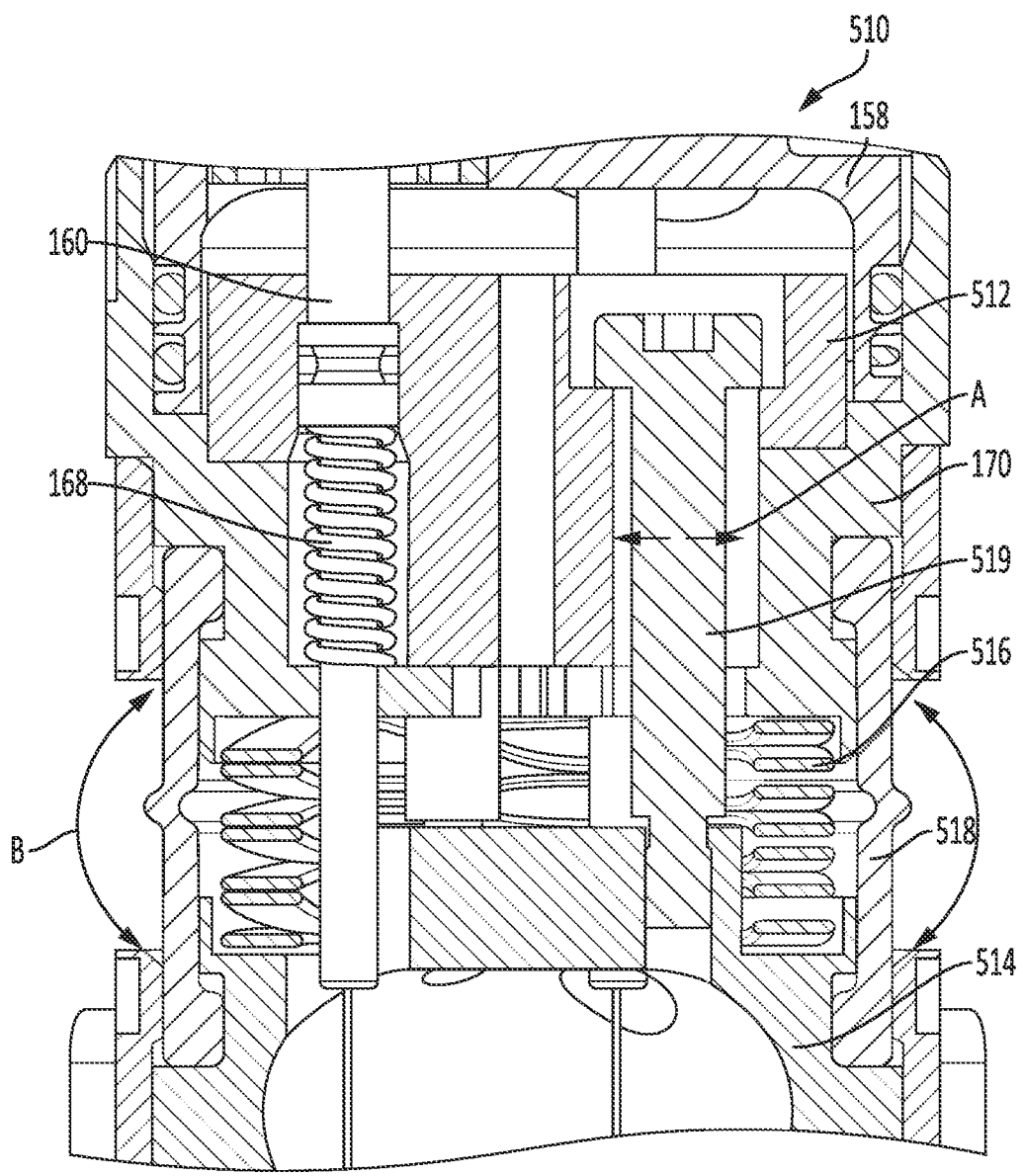
FIG. 7 depicts a cross-section view of a tubing hanger optical connector misalignment compliance assembly, according to one aspect of the present disclosure.

FIGS. 6 through 8 A,B,C depict various structures associated with the tubing hanger optical connector. FIG. 6 is a cross sectional view of the tubing hanger optical connector manifold, particularly illustrating the tubing hanger optical connector front face 152 and a partial view of the guide rail interface 164. As disclosed above, the tubing hanger optical connector guide rail interface 164 is configured to slidably receive the Christmas tree optical connector guide rail during the mating process.

FIG. 6 further illustrates the tubing hanger optical connector check valve assembly 502. As disclosed above, during the mating process, an amount of fluid from the interior of the Christmas tree optical connector manifold is impelled into the space defined by the Christmas tree optical connector front face and the tubing hanger optical connector front face 152. This fluid may be used to flush debris and water away from the space between the Christmas tree optical connector front face and the tubing hanger optical connector front face 152. This flushing action may be timed to occur when the Christmas tree optical connector manifold is compressed into the Christmas tree shell assembly, and the Christmas tree optical connector spherical seals rotate to an open configuration. Additionally, the Christmas tree optical connector optical stem assemblies may be coated with the fluid.

However, once this fluid has been impelled into the space between the Christmas tree optical connector front face and the tubing hanger optical connector front face, extraneous fluid along with the captured debris must be flushed away from the connection site. The fluid and debris may be removed from the connection site via a check valve assembly 502. The check valve assembly 502 may include a check valve face, disposed on the front face 152 of the tubing hanger optical connector manifold. The check valve assembly 502 may include a check valve ball 674 and a check valve retaining ring 672 which together act as the seal against return of the material flushed away. The check valve ball 674 may be biased by a check valve spring 676 against the check valve retaining ring 672. When the Christmas tree optical connector front face is impelled against the tubing hanger optical connector front face 152, it causes an excess pressure to build in the space between the Christmas tree front face and the tubing hanger front face. This pressure against the excess oil, water, and debris may be sufficient to force the check valve ball 674 to move against the check valve spring 676 thereby allowing the oil/water/debris mixture to enter the check valve conduit 678. The oil/water/debris mixture then exits the check valve conduit 678 at the check valve outlet 679. In some examples, the check valve outlet 679 may be in fluid communication with one of the guide rail interfaces 164.

FIG. 7 is a cross-section view of the tubing hanger optical connector misalignment compliance assembly 510. At the top of FIG. 7, the proximal end of the tubing hanger optical connector manifold 158 is sealed within a distal portion of the center housing 170. The seals may include one or more o-ring type seals. A tubing hanger optical connector optical stem retaining plate 512 is disposed in a space between the tubing hanger optical connector manifold 158 and the center housing 170. In one non-limiting aspect, the optical stem retaining plate 512 may abut an edge of a counterbore disposed in the center housing 170.

The tubing hanger optical connector optical stems 160 may be secured within an optical stem pass-through in the retaining plate 512. Each tubing hanger optical connector optical stem 160 may include an optical stem spring 168 held within the optical stem bore. In this manner, some amount of lateral compliance can be imparted into the motion of the tubing hanger optical connector optical stems 160.

The retaining plate 512 may be affixed to a distal end of the misalignment back housing 514 through a plurality of shoulder bolts 519. The shoulder bolt bores, however, may have a larger diameter than the individual shoulder bolts 519, and the diameter of the shoulder bolt counterbore may have a larger diameter than the shoulder bolt head. This configuration may build in compliance against lateral or axial rotational motion as indicated by arrow A.

A misalignment compliance spring 516 is disposed between a proximal end of the center housing 170 and a distal end of the back housing 514. A misalignment outer bladder 518 may surround the compliance spring 516 thereby protecting the interior components of the compliance assembly 510. The compliance spring 516 may provide bending compliance at the joint formed by the compliance spring 516, as indicated by arrow B. Thus, the combination of the compliance spring 516 and the shoulder bolt 519 in its bolt bore provide some amount of translational, rotational, and bending compliance of the tubing hanger optical connector during the Christmas tree optical connector mating procedure.

Figure 8A:
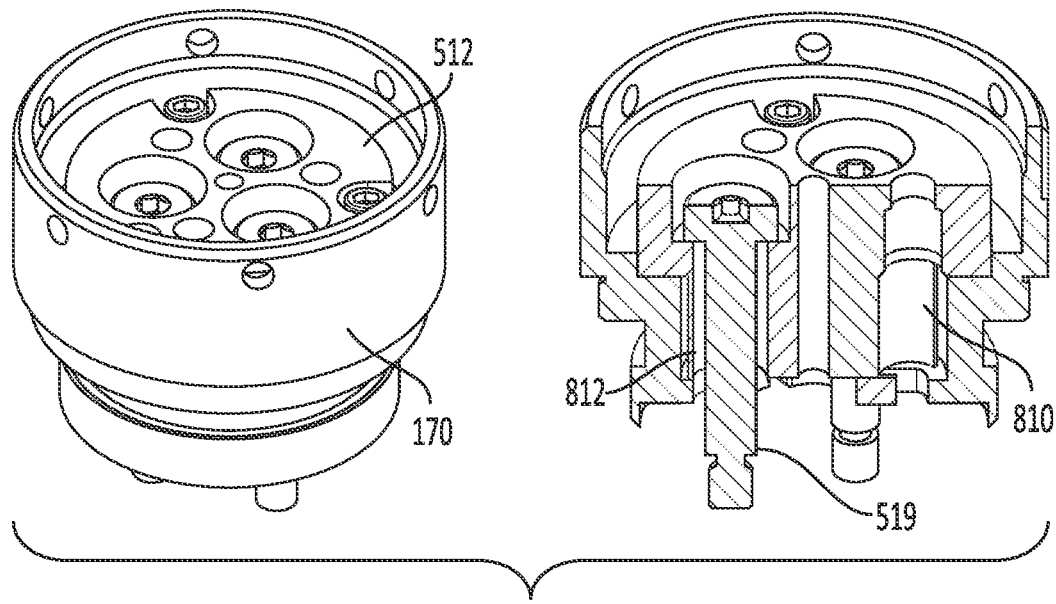
FIG. 8A depicts an isometric view and a cross-section view of a center housing of a tubing hanger optical connector misalignment compliance assembly, according to one aspect of the present disclosure.
Figure 8B:
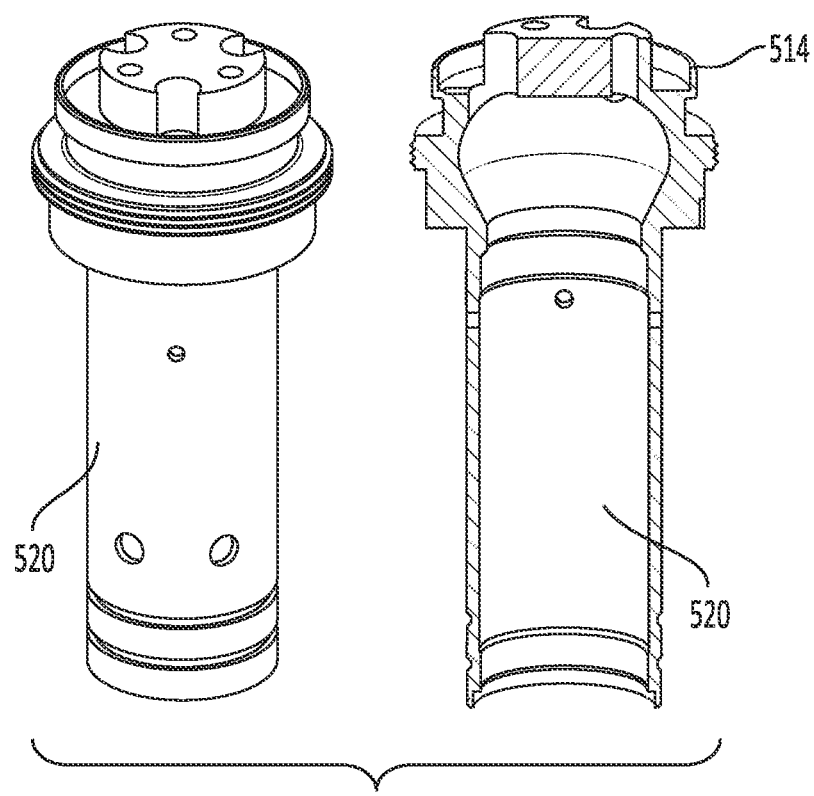
FIG. 8B depicts an isometric view and a cross-section view of a back housing of a tubing hanger optical connector misalignment compliance assembly, according to one aspect of the present disclosure.

FIG. 8A illustrates an isometric view of the distal portion of the compliance assembly 510 in the left figure, and a cross-sectional view of the same components in the right figure. Both figures illustrate the placement of the tubing hanger optical connector stem retaining plate 512 in the center housing 170. The right figure illustrates the placement of one of the plurality of shoulder bolts 519 through one of a plurality of shoulder bolt bores 812, the latter having a larger diameter than the former. Also is illustrated one of a plurality of optical stem pass-throughs 810, which is configured to retain each of a plurality of optical stems. FIG. 8B illustrates the tubing hanger optical connector misalignment back housing 514 attached to the tubing hanger optical connector compensating bladder housing 520. The left figure depicts these structures in an isometric view, while the right figure depicts these structures in a longitudinal cross-sectional view.

Figure 8C:
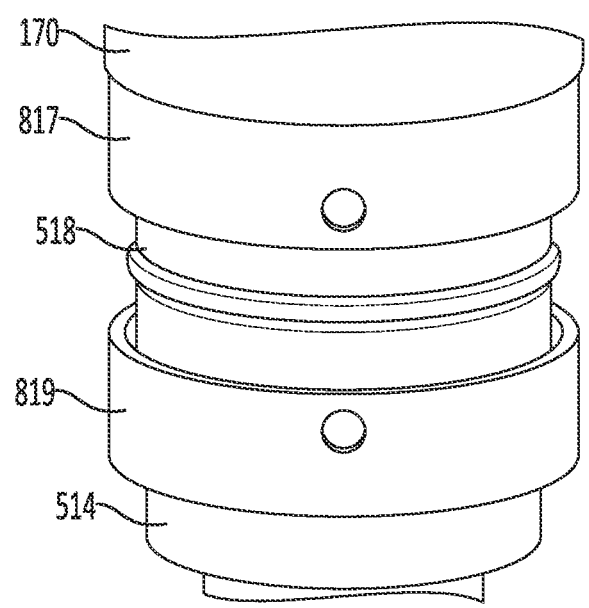
FIG. 8C depicts an isometric view of a tubing hanger optical connector misalignment compliance assembly, according to one aspect of the present disclosure.

FIG. 8C is an isometric exterior view of a portion of the misalignment compliance assembly, especially depicting the interface between the center housing 170 and the back housing 514. Between these two structures is placed the misalignment outer bladder 518 covering the compliance spring (not visible). The outer bladder 518 may be secured to the center housing 170 by means of a center housing locking sleeve 817. Similarly, the outer bladder 518 may be secured to the back housing 514 by means of a back housing locking sleeve 819.

FIGS. 9A through 9I depict various individual components of the Christmas tree optical connector front assembly.

Figure 9A:
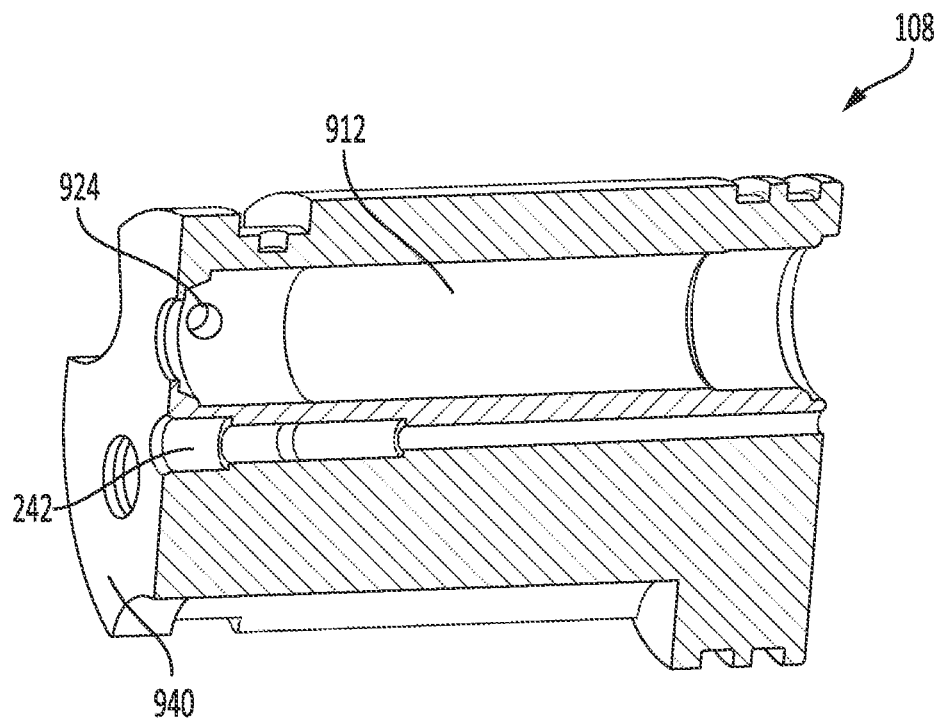
FIGS. 9A,B depict a cross section view and an isometric view, respectively, of a Christmas tree optical connector manifold, according to one aspect of the present disclosure.

FIG. 9A is a cross-sectional view of the Christmas tree optical connector manifold 108. In particular is depicted the compensating fluid port 242 through which the compensating fluid disposed in the interior of the Christmas tree optical connector is inserted. Also depicted is the Christmas tree optical connector manifold distal face 940. The Christmas tree optical connector spherical seal assembly bore 912 is configured to receive the Christmas tree optical connector spherical seal. The Christmas tree optical connector spherical seal dowel pin hole 924 is configured to receive the dowel pin inserted into the Christmas tree optical connector spherical seal ball. Each of the Christmas tree optical connector spherical seal assemblies includes a spherical seal ball affixed to a spherical seal actuator pin and a spherical seal dowel pin. A spherical seal dowel pin is retained in a spherical seal dowel pin hole 924.

Figure 9B:
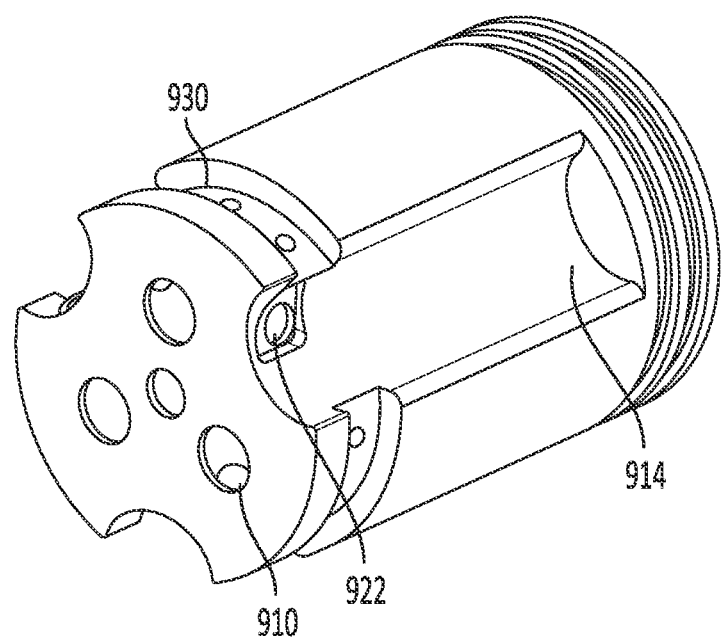
FIG. 9C depicts an isometric view of a Christmas tree optical connector optical stem assemblage, according to one aspect of the present disclosure.
FIG. 9D depicts an isometric view of a Christmas tree optical connector face seal, according to one aspect of the present disclosure.
FIG. 9E depicts an isometric view of a Christmas tree optical connector guide rail and cam groove, according to one aspect of the present disclosure.
FIG. 9F depicts an isometric view of a Christmas tree optical connector shell assembly, according to one aspect of the present disclosure.
FIG. 9G depicts an isometric view of a Christmas tree optical connector latch collet, according to one aspect of the present disclosure.
FIG. 9H depicts isometric views of a Christmas tree optical connector spherical seal actuator pin, according to one aspect of the present disclosure.
FIG. 9I depicts an isometric view of a Christmas tree optical connector insert, according to one aspect of the present disclosure.

FIG. 9B is an isometric view of the same Christmas tree optical connector manifold 108, displaying a Christmas tree optical connector optical stem pass-through 910. The Christmas tree optical connector optical stem pass-through 910 is configured to permit the assembly end of the Christmas tree optical connector optical stems to pass through the front face of the Christmas tree optical connector manifold 108 when the Christmas tree optical connector manifold 108 is impelled into the Christmas tree optical connector shell during the mating procedure. The Christmas tree optical connector spherical seal actuator pin hole 922 is configured to allow the Christmas tree optical connector spherical seal actuator pin cam to protrude into the Christmas tree optical connector guide rail interface 914. As disclosed below, when the Christmas tree optical connector manifold 108 is impelled into the Christmas tree optical connector shell, the Christmas tree optical connector manifold 108 slidably engages the guide rail affixed on an inner surface of the Christmas tree optical connector shell via the Christmas tree optical connector guide rail interface 914. As the Christmas tree optical connector manifold 108 traverses the guide rail, the actuator pin cam engages with a cam groove fabricated in the guide rails. Also depicted in FIG. 9B is a latch collet mount, configured to receive the Christmas tree optical connector latch collet to help secure the connection between the Christmas tree optical connector and the tubing hanger optical connector at the beginning of the mating procedure. The latch collet mount may include a plurality of latch collet mounting holes 360 to receive hardware such as screws to affix the latch collet to the Christmas tree optical connector manifold 108.

Figure 9C:
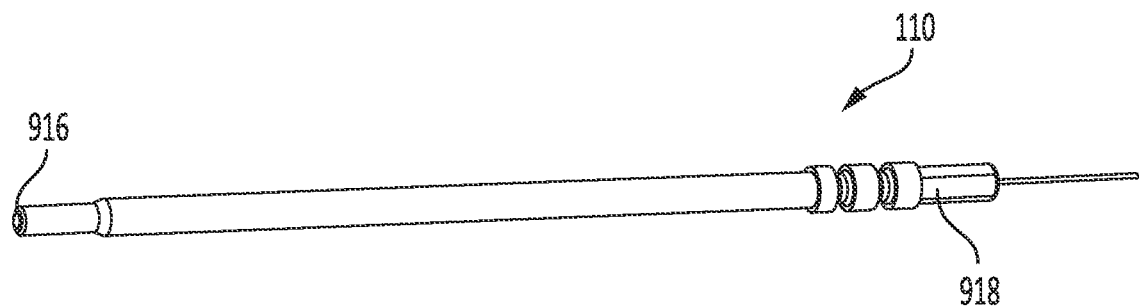

FIG. 9C is an isometric view of a Christmas tree optical connector optical stem assemblage composed of a Christmas tree optical connector optical stem 110. The Christmas tree optical connector optical stem 110 may include an optical stem key flat 918 at a proximal and an optical stem assembly 916 at a distal end. The optical stem key flat 918 may be used to secure the proximal end of the optical stem 110 into the optical stem mount. The optical stem assembly 916 may be configured to provide an optical interface between a Christmas tree optical connector optical stem 110 and an opposing tubing hanger optical connector optical stem.

Figure 9D:
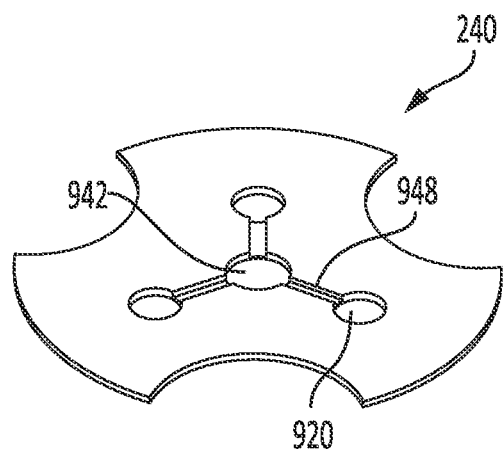

FIG. 9D illustrates a Christmas tree optical connector face seal 240. The Christmas tree optical connector face seal 240 includes a plurality of face seal optical stem pass-throughs 920, a central face seal check valve access 942, and multiple face seal flushing channels 948. The face seal 240 may be disposed against the Christmas tree optical connector manifold distal face 940. The center face seal check valve access 942 is disposed opposite the tubing hanger optical connector check valve face, and also permits access to the Christmas tree optical connector compensating fluid port 242. Each of the face seal optical stem pass-throughs 920 is disposed over one of the plurality of Christmas tree optical connector optical stem pass-throughs. When the Christmas tree optical connector manifold 108 is impelled into the Christmas tree optical connector shell, the Christmas tree optical connector spherical seals rotate, thereby allowing the Christmas tree optical connector optical stem assembly 916 to traverse the spherical seal ball optical stem bore holes. The optical stem assembly 916 may then traverse a Christmas tree optical connector optical stem pass-through 910 as well as the face seal optical stem pass-through 920. While the Christmas tree optical connector manifold 108 is impelled into the interior of the Christmas tree optical connector shell, compensating fluid from the interior of the Christmas tree optical connector shell is also exuded through the spherical seal ball optical stem bore holes into the Christmas tree optical connector face seal optical stem pass-throughs 920. The exuded fluid may wash a surface of each of the Christmas tree optical connector optical stem assemblies 916 as well as wash away any debris collected on the face of the Christmas tree optical connector face seal 240. The excess compensating fluid may then flow along the plurality of face seal flushing channels 948 to the face seal check valve access 942. From there, the excess compensating fluid and debris may enter the check valve face and flow through the check valve.

Figure 9E:
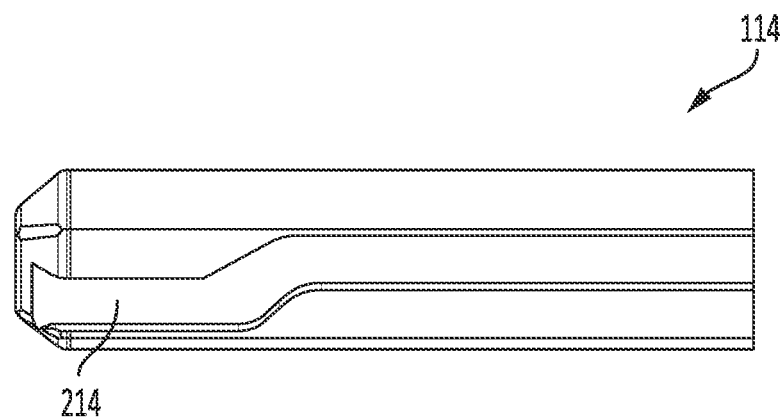

FIG. 9E is an isometric view of a Christmas tree optical connector guide rail 114, also showing the cam groove 214 fabricated therein. As disclosed above, and discussed below with respect to FIGS. 21A-D, when a spherical seal actuator pin cam (either a Christmas tree optical connector or a tubing hanger optical connector spherical seal actuator pin cam) engages the cam groove 214, the motion of the cam in the groove 214 causes the spherical seal ball to rotate about an axis defined in part by the spherical seal actuator pin. This results in the spherical seal assuming an open configuration, permitting the traversal of the spherical seal ball optical stem bore hole by the Christmas tree optical connector optical stem assembly 916 of the appropriate Christmas tree optical connector optical stem 110.

Figure 9F:
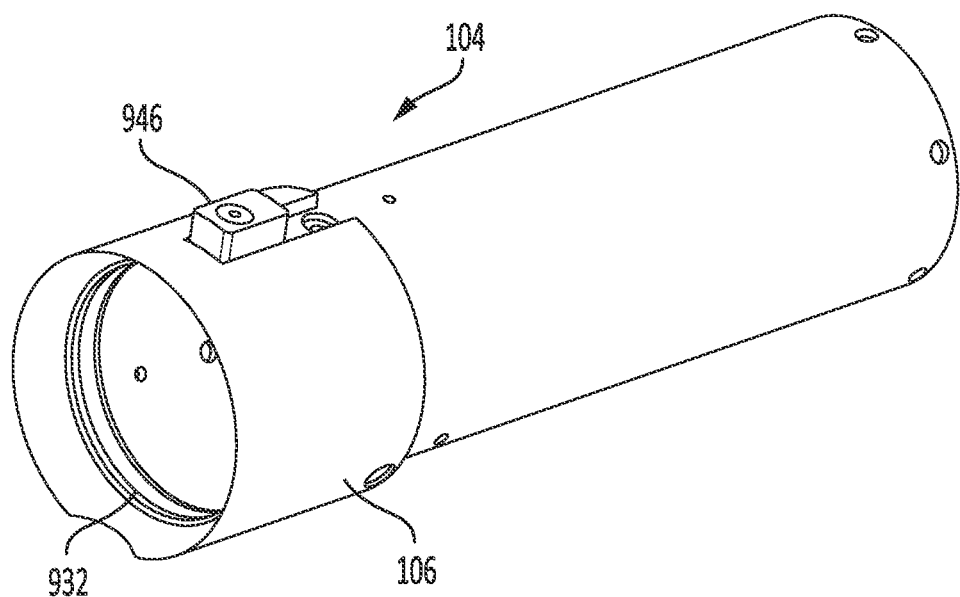

FIG. 9F is an isometric view of the Christmas tree optical connector shell assembly 104 including the Christmas tree optical connector shell assembly shroud 106 and Christmas tree optical connector alignment key 946. It may be recognized that both the tubing hanger optical connector and the Christmas tree optical connector front ends are cylindrically symmetric. Therefore, it may be difficult to properly align the two connector components to assure that the optical stems of the Christmas tree optical connector properly engage the spherical seal ball optical stem bore holes of the tubing hanger optical connector during the mating procedure. The Christmas tree optical connector alignment key 946 may be used to align the Christmas tree optical connector with the tubing hanger optical connector (tubing hanger optical connector alignment key not shown) by mating the Christmas tree optical connector alignment key 946 with the equivalent tubing hanger optical connector alignment key at the start of the mating procedure. In addition, fabricated on a distal edge of the Christmas tree optical connector shell, is a latch collet relief 932 configured to receive a distal edge of the latch collet 230.

Figure 9G:
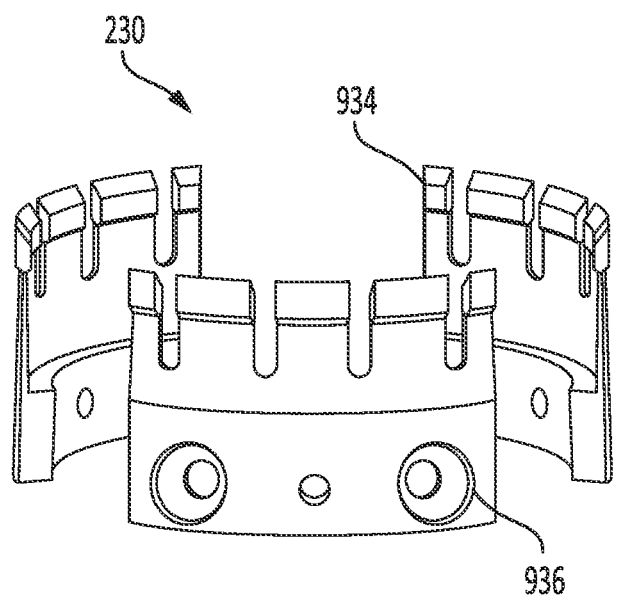

FIG. 9G is an isometric view of the components of the Christmas tree optical connector latch collet 230, illustrating the latch collet teeth 934 and the latch collet attachment holes 936. The latch collet attachment holes 936 provide access for mounting hardware to mount the latch collet 230 to the latch collet mounting holes 930 of the Christmas tree optical connector manifold 108. The latch collet teeth 934 are configured to interface with the latch collet interface of the tubing hanger optical connector manifold at the beginning of the mating procedure.

Figure 9H:
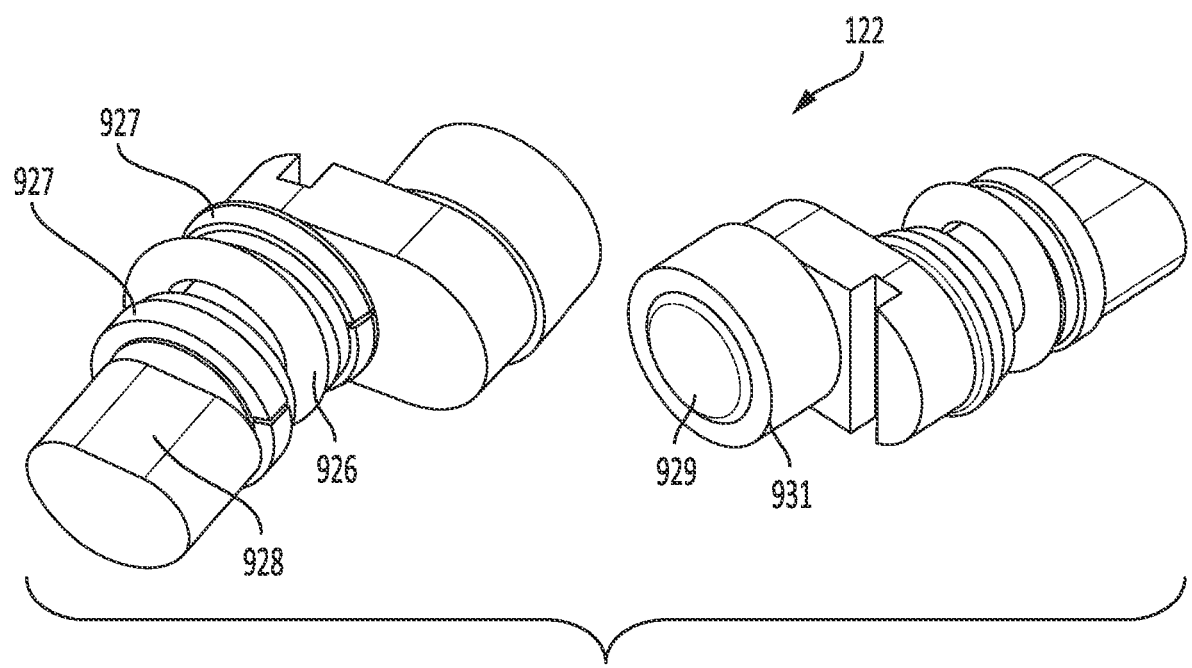

FIG. 9H depicts two views of an example of a Christmas tree optical connector spherical seal actuator pin 122. In the left figure, the side of the Christmas tree optical connector spherical seal actuator pin 122 proximate to the spherical seal ball is depicted. In the right figure, the side of the Christmas tree optical connector spherical seal actuator pin 122 proximate to the cam groove 214 is depicted. In the left figure, the Christmas tree optical connector spherical seal actuator pin 122 displays an actuator pin key flat 928, which is inserted into an actuator pin interface in the spherical seal ball. The actuator pin seal 926 is disposed within the actuator pin hole 922 in the Christmas tree optical connector manifold 108. Actuator pin seal bushings 927 are placed on opposing sides of the actuator pin seal 926. The actuator pin seal bushings 927 may allow the actuator pin 122 to rotate in the actuator pin hole 922. In the right figure, the actuator pin cam 929 is illustrated. As previously disclosed, the actuator pin cam 929 may traverse the cam groove 214 in a guide rail 114 during the mating procedure. In some aspects, the actuator pin cam 929 may be surrounded by a slidably attached actuator pin cam bushing 931. The actuator pin cam bushing 931 may be configured to rotate around the actuator pin cam 929. In this aspect, the actuator pin cam bushing 931 may make the contact with the cam groove 214, and may rotate around the actuator pin cam 929 as the actuator pin cam 929 traverses the cam groove 214.

Figure 9I:
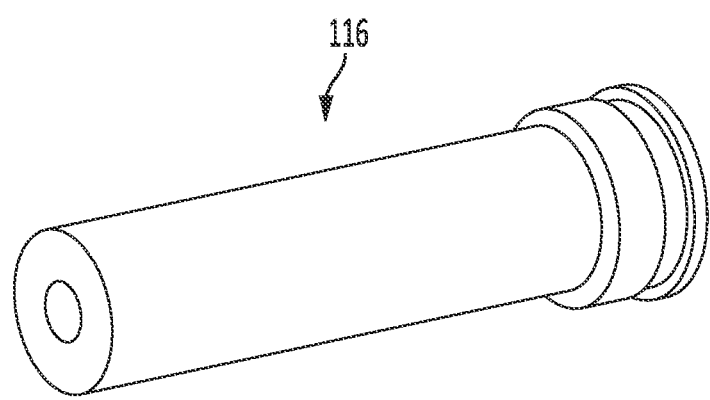

FIG. 9I is an isometric view of a Christmas tree optical connector insert 116. It may be understood that as the Christmas tree optical connector manifold 108 is impelled into the interior of the Christmas tree optical connector shell assembly 104 during the mating procedure, the Christmas tree optical connector optical stem assembly 916 and the Christmas tree optical connector optical stem 110 traverse through an interior of the Christmas tree optical connector insert 116 as it is exposed through the spherical seal. A Christmas tree optical connector insert 116 may be disposed within a Christmas tree optical connector seal assembly bore 912.

Figure 10A:
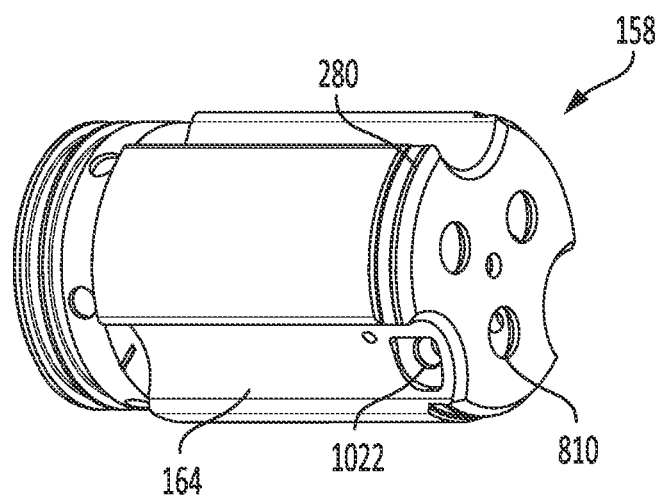
FIGS. 10A,B depict an isometric view and cross-section view, respectively, of a tubing hanger optical connector manifold, according to one aspect of the present disclosure.
Figure 10B:
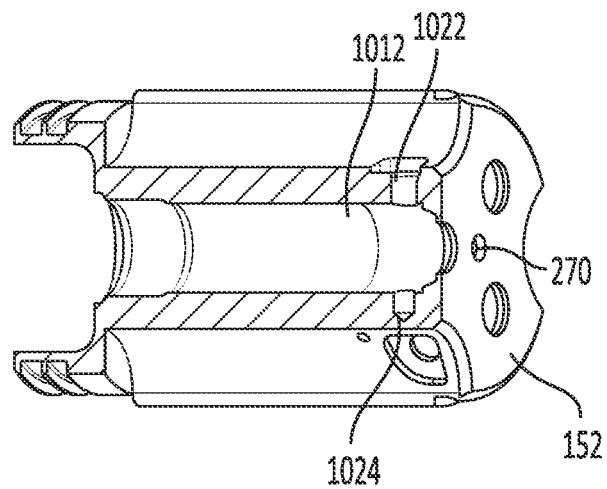
FIG. 10C depicts an isometric view of a tubing hanger optical connector insert, according to one aspect of the present disclosure.
FIG. 10D depicts an isometric view and a partial cross-section view of a tubing hanger optical connector optical stem assemblage, according to one aspect of the present disclosure.
FIG. 10E depicts isometric views of a tubing hanger optical connector spherical seal actuator pin, according to one aspect of the present disclosure.

FIGS. 10A through 10E depict additional components associated with the tubing hanger optical connector. FIGS. 10A and 10B depict an isometric view and a cross sectional view, respectively, of a tubing hanger optical connector manifold 158. FIG. 10A illustrates a plurality of guide rail interfaces 164, each of which is configured to slidably engage one of the plurality of guide rails disposed on an interior surface of the Christmas tree optical connector shell assembly. Each of a plurality of tubing hanger optical connector spherical seal actuator pin holes 1022 permits one of a plurality of tubing hanger optical connector spherical seal actuator pin cams to be exposed within the tubing hanger optical connector guide rail interface 164. In this manner, during the mating procedure, the tubing hanger optical connector spherical seal actuator pin cam enters into the Christmas tree optical connector cam groove in order to rotate the spherical seal ball of the tubing hanger optical connector. In the front face 152 of the tubing hanger optical connector manifold 158 are a plurality of tubing hanger optical connector optical stem pass-throughs 810. When the plurality of tubing hanger optical connector spherical seals are rotated into an open position, the each of the assemblies of the plurality of optical stems of the Christmas tree optical connector may enter one of the plurality of tubing hanger optical connector spherical seal balls through the tubing hanger optical connector optical stem pass-throughs 810. FIG. 10A also depicts the latch collet interface 280 disposed at the distal edge of the tubing hanger optical connector manifold 158. As disclosed above, the latch collet interface 280 is configured to receive the teeth of the latch collet when the tubing hanger optical connector manifold 158 makes first contact with the distal face of the Christmas tree optical connector manifold at the beginning of the mating procedure.

FIG. 10B is a cross-section view of the tubing hanger optical connector manifold 158, particularly showing the tubing hanger optical connector seal assembly bore 1012. At the distal end of each tubing hanger optical connector seal assembly bore 1012, where each of the tubing hanger optical connector spherical seal assemblies is located, may be found a tubing hanger optical connector spherical seal actuator pin hole 1022 and a tubing hanger optical connector spherical seal dowel pin hole 1024. Similar to the function of the Christmas tree optical connector spherical seal assemblies, each of the plurality of tubing hanger optical connector spherical seal assemblies includes a tubing hanger optical connector spherical seal ball affixed to a tubing hanger optical connector spherical seal actuator pin and a tubing hanger optical connector spherical seal dowel pin. The tubing hanger optical connector spherical seal dowel pin is retained in a tubing hanger optical connector spherical seal dowel pin hole 1024.

FIG. 10B also depicts the location of the tubing hanger optical connector check valve face 270 disposed in the middle of the front face 152 of the tubing hanger optical connector manifold 158. During the mating procedure, as the tubing hanger optical connector manifold 158 impels the Christmas tree optical connector manifold to retract into the Christmas tree optical connector shell assembly, compensating fluid is emitted from the Christmas tree optical connector shell interior to flush debris from the surfaces of both the Christmas tree optical connector manifold and the tubing hanger optical connector manifold. The pressure caused by the Christmas tree optical connector manifold being impelled into the Christmas tree optical connector shell assembly may cause the compensating fluid to become pressurized before the Christmas tree optical connector spherical seals open due to the interaction of the Christmas tree optical connector spherical seal actuator cam and the cam groove. The fluid may be dispersed along with any debris between the faces into the tubing hanger optical connector check valve face 270 and into the check valve assembly. The check valve assembly may be activated due to the pressure differential present caused by the compression of the Christmas tree optical connector manifold.

Figure 10C:
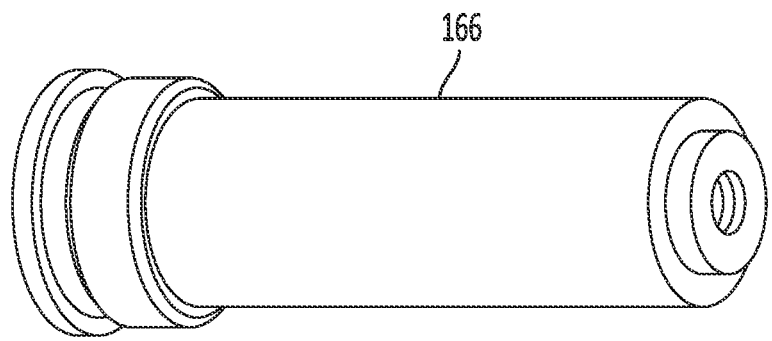

FIG. 10C is an isometric view of a tubing hanger optical connector insert 166. The tubing hanger optical connector insert 166 may be disposed within a tubing hanger optical connector seal assembly bore 1012. Each of the tubing hanger optical connector optical stems may be disposed at a proximal end of the tubing hanger optical connector insert 166. During the mating procedure, each of the Christmas tree optical connector optical stems may traverse one of the plurality of tubing hanger optical connector optical stem pass-throughs 810 and enter one of the tubing hanger optical connector inserts 166 at a distal end.

Figure 10D:
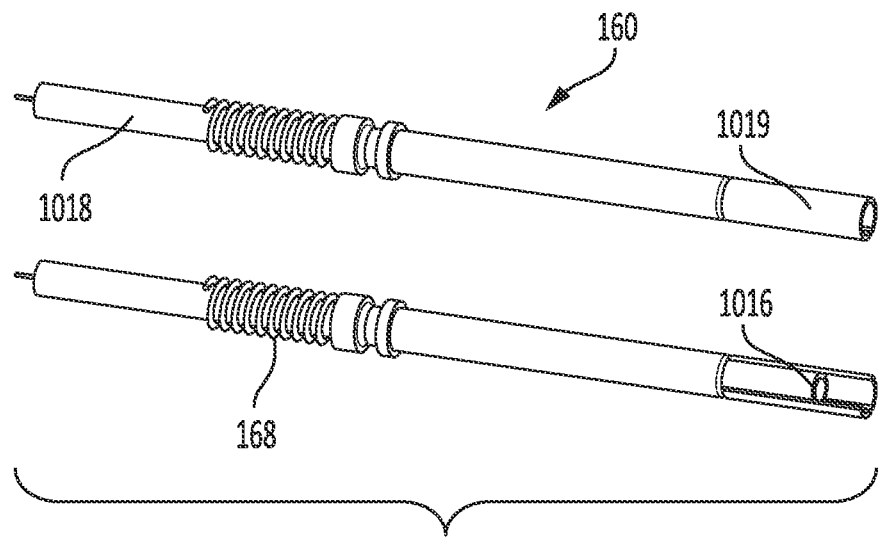

FIG. 10D is an isometric view of a tubing hanger optical connector optical stem assemblage composed of a tubing hanger optical connector optical stem 160 and a tubing hanger optical connector optical stem spring 168. At a proximal end of the tubing hanger optical connector optical stem 160 may be a tubing hanger optical connector optical stem key flat 1018. The tubing hanger optical connector optical stem key flat 1018 may be used to provide rotational alignment for the tubing hanger optical connector optical stem 160 when it mates with the Christmas tree optical connector optical stem 110. Also, at the proximal end of the tubing hangar optical connector optical stem 160, the diameter of the stem may be captured to secure the stem into the tubing hanger optical connector center housing. At a distal end of the tubing hanger optical connector optical stem 160 may be a tubing hanger optical connector split sleeve 1019. Disposed within the tubing hanger optical connector split sleeve 1019 may be a tubing hanger optical connector optical stem assembly 1016. Once the Christmas tree optical connector optical stem enters a tubing hanger optical connector insert 166, it may be directed to form a physical and optical contact with the opposite tubing hanger optical connector optical stem assembly 1016. The split sleeve 1019 may help direct the assembly of a Christmas tree optical connector optical stem to the assembly of the tubing hanger optical connector optical stem 160.

FIG. 10D further illustrates the tubing hanger optical connector optical stem spring 168. The tubing hanger optical connector optical stem spring 168 may help form a compliant seating of the tubing hanger optical connector optical stem 160. Such compliance is necessary when the tubing hanger optical connector optical stem 160 is mated to the Christmas tree optical connector optical stem. It is known to one skilled in the art that an optical connection system must maintain a preload to ensure optical contact over the performance specification range for the connection system. The compliance due to the optical stem spring 168 may permit off-axis insertion of the Christmas tree optical connector optical stem in the tubing hanger optical connector optical stem split sleeve 1019 and accommodate tolerance stack-up issues with regard to final axial location of both optical stems when mated.

Figure 10E:
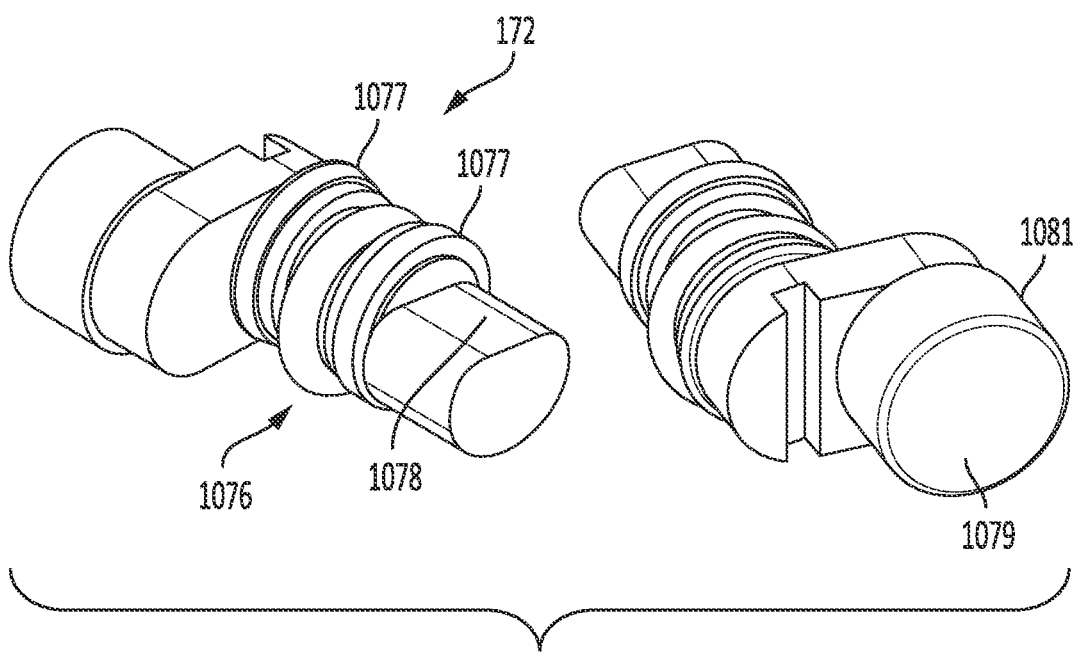

FIG. 10E depicts two views of one of the plurality of tubing hanger optical connector spherical seal actuator pins 172. These tubing hanger optical connector spherical seal actuator pins 172 are similar in structure to, and act similarly to, the equivalent Christmas tree optical connector spherical seal actuator pins 122 depicted in FIG. 9H. In the left figure, the side of the tubing hanger optical connector actuator pin 172 proximate to the tubing hanger optical connector spherical seal ball is depicted. In the right figure, the side of the tubing hanger optical connector actuator pin 172 proximate to the cam groove is depicted. In the left figure, the tubing hanger optical connector actuator pin 172 displays a tubing hanger optical connector actuator pin key flat 1078, which is inserted into a tubing hanger optical connector actuator pin interface in the tubing hanger optical connector spherical seal ball. The tubing hanger optical connector actuator pin seal 1076 is disposed within the tubing hanger optical connector actuator pin hole 1024 in the tubing hanger optical connector manifold 158. Tubing hanger optical connector actuator pin seal bushings 1077 are placed on opposing sides of the tubing hanger optical connector actuator pin seal 1076. In the right figure, the tubing hanger optical connector spherical seal actuator pin cam 1079 is illustrated. As previously disclosed, the tubing hanger optical connector spherical seal actuator pin cam 1079 traverses the cam groove 214 in each guide rail 114 during the mating procedure. In some aspects, the tubing hanger optical connector spherical seal actuator pin cam 1079 may be surrounded by a slidably attached tubing hanger optical connector spherical seal actuator pin cam bushing 1081. The tubing hanger optical connector spherical seal actuator pin cam bushing 1081 may be configured to rotate around the tubing hanger optical connector spherical seal actuator pin cam 1079. In this aspect, the tubing hanger optical connector spherical seal actuator pin cam bushing 1081 may make the contact with the cam groove 214, and may rotate around the tubing hanger optical connector spherical seal actuator pin cam 1079 as the tubing hanger optical connector spherical seal actuator pin cam 1079 traverses the cam groove 214.

Figure 11:
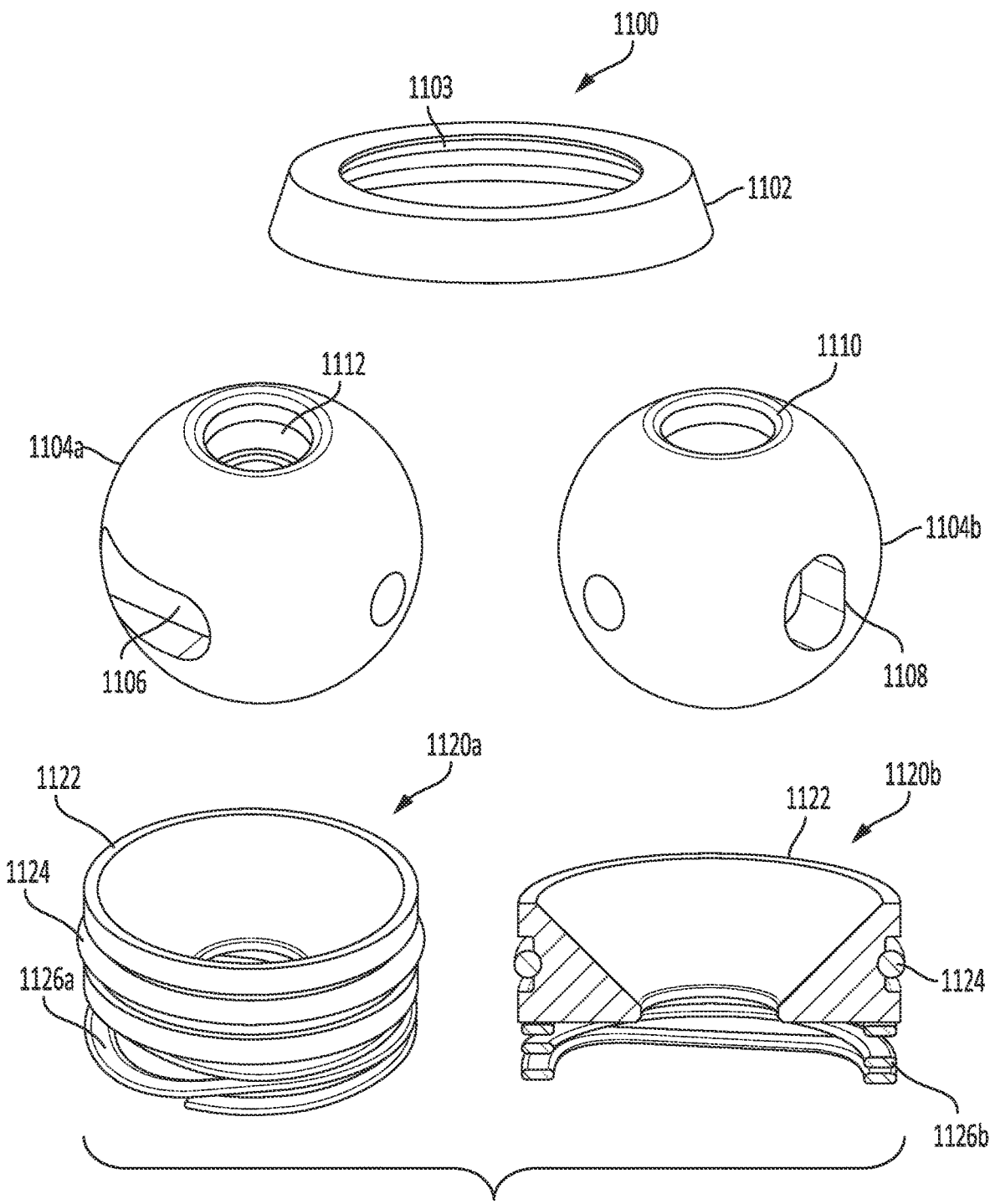
FIG. 11 depicts an exploded isometric view of a spherical seal assembly for both a Christmas tree optical connector and a tubing hanger optical connector, according to one aspect of the present disclosure.

FIG. 11 illustrates several views of a spherical seal assembly 1100. The structure of the spherical seal assembly 1100 depicted in FIG. 11 and disclosed herein may equally apply to the each of a plurality of Christmas tree optical connector spherical seal assemblies as well as to each of a plurality of tubing hanger optical connector spherical seal assemblies.

The top image of FIG. 11 illustrates an isometric view of the top seal 1102 of the spherical seal assembly. The middle set of images depict two isometric views of the spherical seal ball 1104a,b. The bottom set of images depict the spherical seal bottom seal assembly in which bottom seal assembly 1120a is an isometric view and bottom seal assembly 1120b is a cross-sectional view.

The top seal 1102 is configured to rest against a top portion of the spherical seal ball 104a,b. When the top seal 1102 is compressed against the spherical seal ball 1104a,b, a top seal o-ring 1103 may form a fluid-tight seal against a surface of the spherical seal ball 1104a,b. It may be recognized that the top seal o-ring 1103 does not have to be applied around an entire circumference of the spherical seal ball 1104a,b. Instead, the top seal o-ring 1103 may need only to be applied to an upper surface ring portion of the spherical seal ball 1104a,b. In this manner, water from the deep-water environment is prevented from leaking into the interior spaces of either of the Christmas tree optical connector manifold or the tubing hanger optical connector manifold when the spherical seal assembly is in a closed position. Additionally, the top seal o-ring 1103 may prevent the compensating fluid disposed in the interior of the Christmas tree optical connector shell assembly from leaking out before it is exuded during the mating procedure.

The spherical seal ball 1104a illustrates a spherical seal ball dowel pin interface 1106. Spherical seal ball 1104b illustrates a spherical seal ball actuator pin interface 1108. The dowel pin interface 1106 is configured to receive a dowel pin in either of a Christmas tree optical connector spherical seal assembly or a tubing hanger optical connector spherical seal assembly. The actuator pin interface 1108 is configured to receive an actuator pin in either of a Christmas tree optical connector spherical seal assembly or a tubing hanger optical connector spherical seal assembly. It may be observed that the actuator pin interface 1108 is configured to receive a actuator pin key flat (as depicted in FIGS. 9H and 10E) thereby fixing the position of the actuator pin within the actuator pin interface 1108. The dowel pin interface 1106 and activator pin interface 1108 are oppositely disposed on the body of the spherical seal ball 1102*a,b*. In this manner, the dowel pin and activator pin form an axis about which the spherical seal ball 1102*a,b*, may rotate during the mating procedure (see FIGS. 21A-D).

Each spherical seal ball 1104*a,b* has an optical stem bore hole 1110 which transects the spherical seal ball 1104*a,b* along an axis orthogonal to the axis defined by the actuator pin and the dowel pin. The optical stem bore hole 1110 is configured to receive at least the optical stem assembly of one of the plurality of Christmas tree optical connector optical stems. A spherical seal assembly mounted within the Christmas tree optical connector manifold may slidably receive a Christmas tree optical connector optical stem assembly as well as at least a portion of one of the Christmas tree optical connector optical stems during the mating procedure. A spherical seal assembly mounted within the tubing hanger optical connector manifold may also slidably receive a Christmas tree optical connector optical stem assembly as well as at least a portion of one of the Christmas tree optical connector optical stems during the mating procedure. The Christmas tree optical connector optical stem may be secured within the optical stem bore hole 1110 by a optical stem seal 1112. The optical stem seal 1112 may also act as a fluid barrier while a Christmas tree optical connector optical stem slides through the optical stem bore hole 1110 during the mating procedure.

Bottom seal assembly 1120*a* is an isometric view of the bottom seal assembly, while bottom seal assembly 1120*b* is a cross-section view of the same. The bottom seal assembly 1120*a,b* includes a bottom seal seat 1122 in which the spherical seal ball 1104*a,b* is retained. The bottom seal seat centering o-ring 1124 provides a seal of the bottom seal seat 1122 against the Christmas tree optical connector manifold or tubing hanger optical connector manifold to prevent fluid leakage into the internal space within the respective manifold. The bottom of the bottom seal seat 1122 is in mechanical contact with a bottom seal seat spring 1126*a,b* which provides a bias to the bottom seal seat 1122 and spherical seal ball 1104*a,b* against the top seal 1102. The bottom seal seat spring 1126*a* is depicted in an uncompressed, or unbiasing, state, while the bottom seal seat spring 1126*b* is depicted in a compressed, or biasing, state.

Figure 12:
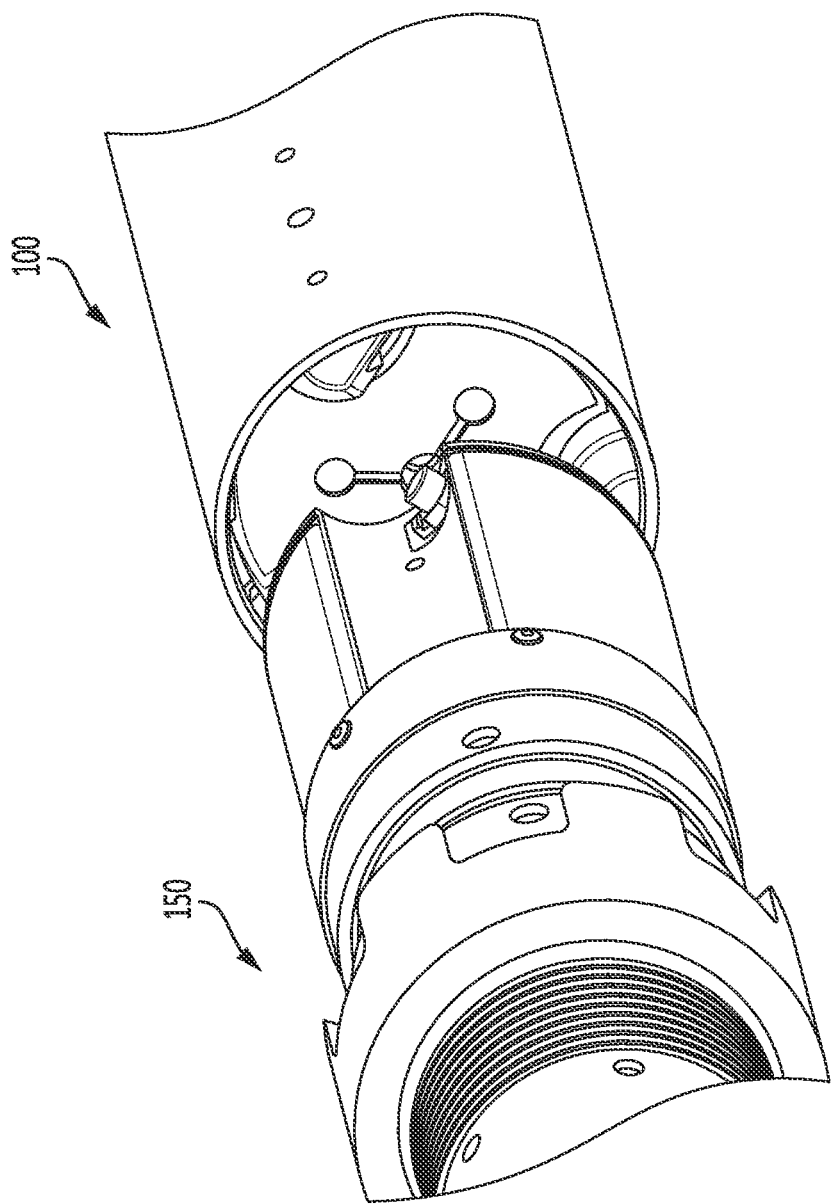
FIG. 12 depicts an isometric view of a Christmas tree optical connector front assembly approximating a tubing hanger optical connector front assembly, according to one aspect of the present disclosure.

FIGS. 12 through 20A,B,C depict various stages comprising the mating procedure between the Christmas tree optical connector and the tubing hanger optical connector. FIG. 12 illustrates an initial stage in which the Christmas tree optical connector front assembly 100 is brought proximate to the tubing hanger optical connector front assembly 150. The Christmas tree optical connector assembly and the tubing hanger optical connector assembly may be essentially co-linear with each other to assist in the mating procedure. In the disclosures that follow, individual components—such as optical stems, spherical seal assemblies, guide rails, and others—as well as their actions and interactions may be described in the singular. It may be recognized that where a plurality of such components exist, that the disclosures apply to each member of the plurality of such components.

Figure 13A:
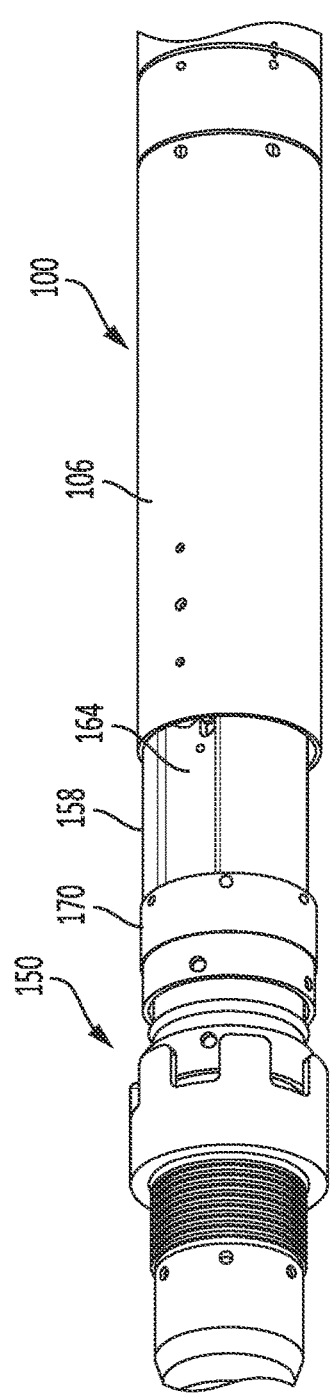
FIGS. 13A,B,C-20A,B,C depict the stages of a Christmas tree optical connector front assembly mating with a tubing hanger optical connector front assembly, according to one aspect of the present disclosure. Specifically.
Figure 13B:
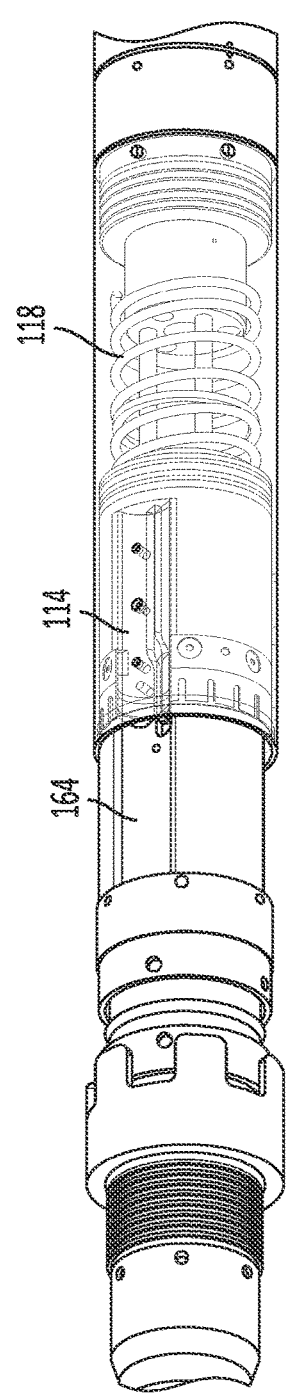
FIGS. 13B, 15B, 17B, and 19B depict isometric partial transparent views of the mating of a Christmas tree optical connector front assembly to a tubing hanger optical connector front assembly, according to one aspect of the present disclosure.

FIGS. 13A, 15A, 17A, and 19A depict isometric exterior views corresponding to the sequential steps in the mating procedure between a Christmas tree optical connector front assembly 100 and a tubing hanger optical connector front assembly 150. FIG. 13A depicts a first step in which the tubing hanger optical connector manifold 158 is place just within the Christmas tree optical connector shell assembly shroud 106. Also depicted are the tubing hanger optical connector center housing 170 disposed proximal to the tubing hanger optical connector manifold 158 and the tubing hanger optical connector guide rail interface 164. As can be observed throughout the sequence of FIGS. 13A, 15A, 17A, and 19A, the tubing hanger optical connector manifold 158 is impelled deeper into the Christmas tree optical connector front assembly until (at FIG. 19A) the tubing hanger optical connector center housing 170 is partially disposed in the interior of the Christmas tree optical connector shroud 106.

Figure 15A:
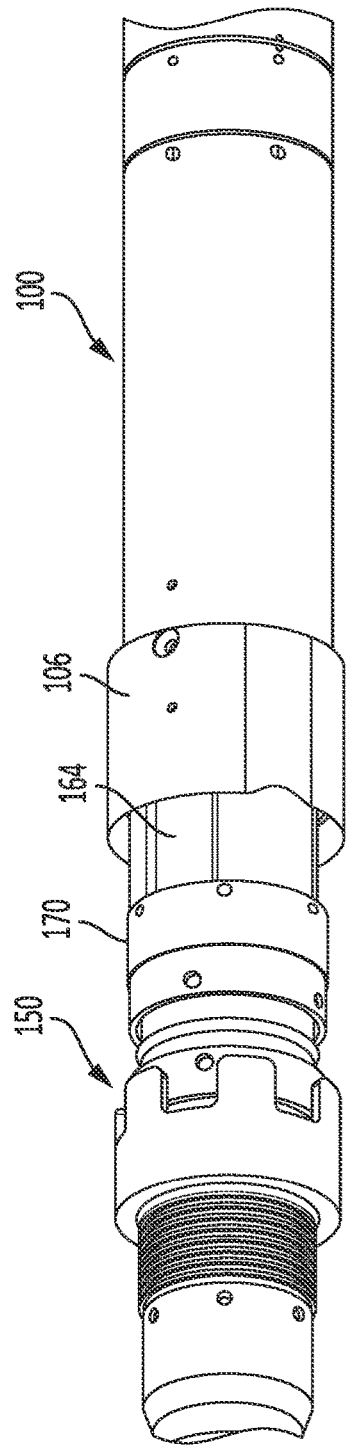
Figure 15B:
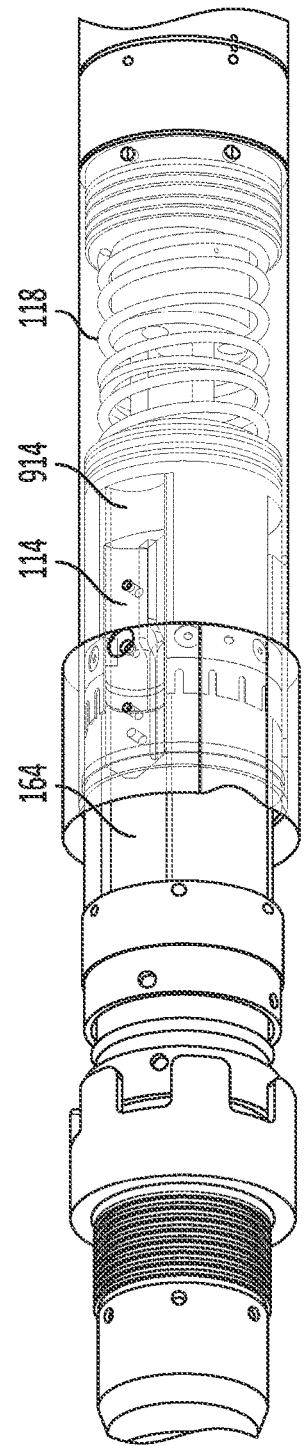
Figure 17A:
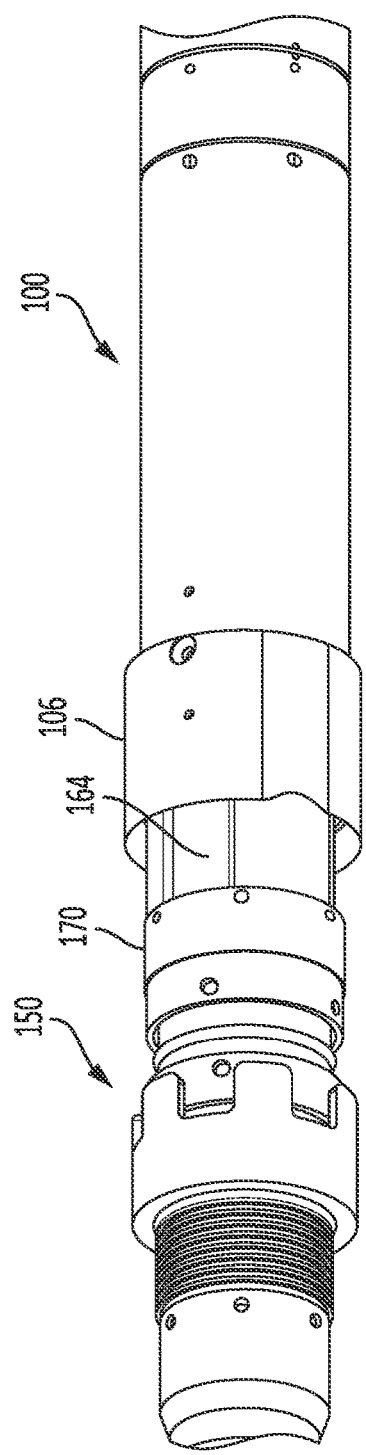
Figure 17B:
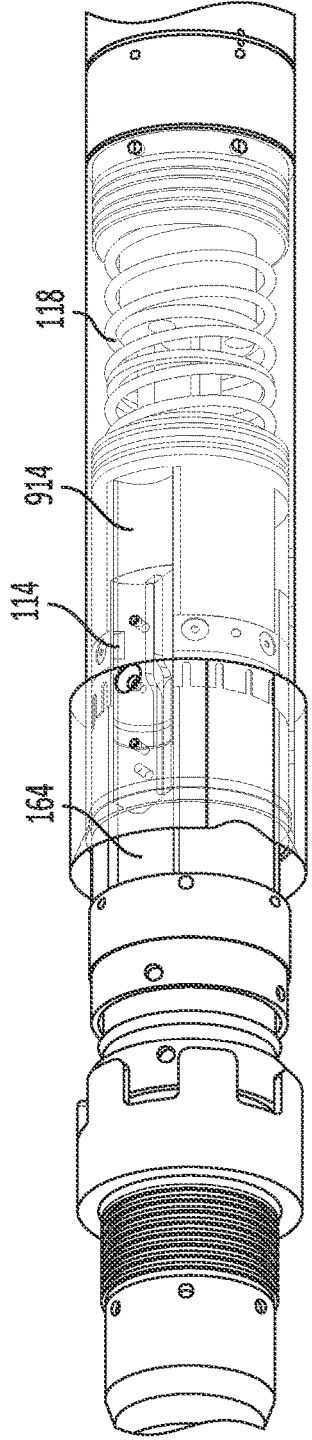
Figure 19A:
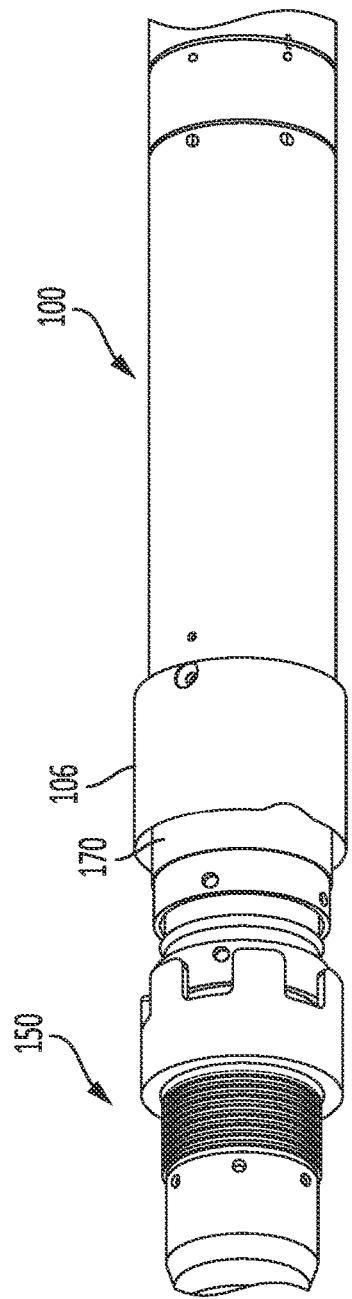
Figure 19B:
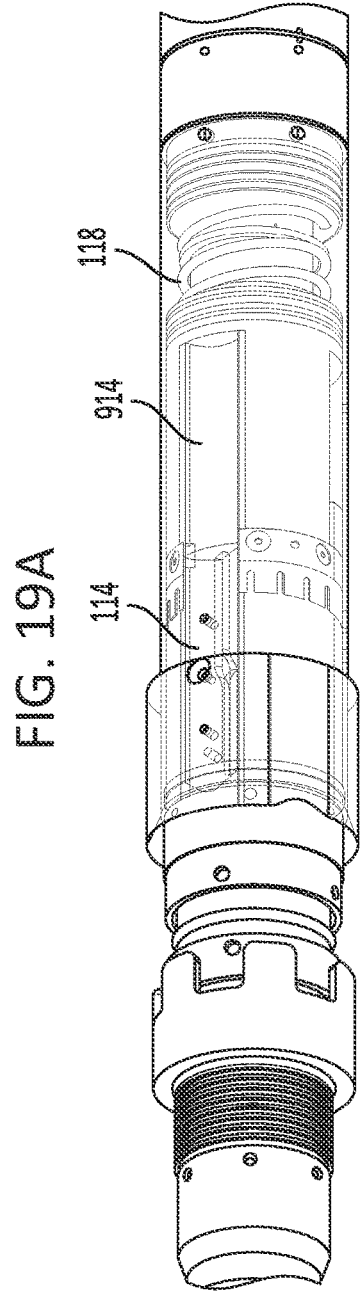

FIGS. 13B, 15B, 17B, and 19B depict partial transparent views corresponding to the sequential steps in the mating procedure between a Christmas tree optical connector front assembly and a tubing hanger optical connector front assembly. In particular, FIGS. 13B, 15B, 17B, and 19B focus on the slidable engagement of a tubing hanger optical connector guide rail interface 164 and a Christmas tree optical connector guide rail interface 914 with their equivalent Christmas tree optical connector guide rail 114. Thus, in FIG. 13B, the tubing hanger optical connector manifold enters the Christmas tree optical connector shroud and a tubing hanger optical connector guide rail interface 164 engages a Christmas tree optical connector guide rail 114. The Christmas tree optical connector guide rail is already engaged by a Christmas tree optical connector guide rail interface 914. As the tubing hanger optical connector manifold is impelled into the Christmas tree optical connector shell assembly, as depicted in FIGS. 15B and 17B, the tubing hanger optical connector manifold impels the Christmas tree optical connector manifold in a proximal direction by compressing the Christmas tree optical connector compression spring 118. As the tubing hanger optical connector guide rail interface 164 slides along a side of a Christmas tree optical connector guide rail 114, thereby increasing its engagement with the guide rail 114, the Christmas tree optical connector guide rail interface 914 is displaced in a proximal direction thus reducing its engagement with the guide rail 114. FIG. 19B illustrates the end of the procedure in which the tubing hanger optical connector manifold is completely inserted into the Christmas tree optical connector shell, having forced the Christmas tree optical connector manifold to retract to its fully proximal position. It may be further observed that the Christmas tree optical connector compression spring 118 is in a fully compressed position.

FIGS. 13C, 15C, 17C, and 19C depict cross-sectional views corresponding to the sequential steps in the mating procedure between a Christmas tree optical connector front assembly and a tubing hanger optical connector front assembly. In particular, FIGS. 13C, 15C, 17C, and 19C focus on the opening sequences of the Christmas tree optical connector spherical seal assembly 112 and the tubing hanger optical connector spherical seal assembly 162 as the tubing hanger optical connector manifold impels the Christmas tree optical connector manifold 108 into the proximal section of the Christmas tree optical connector shell assembly. FIGS. 13C, 15C, 17C, and 19C also depict the sequential compression of the Christmas tree optical connector compression spring 118 as the Christmas tree optical connector manifold is impelled into the Christmas tree optical connector front assembly.

Figure 13C:
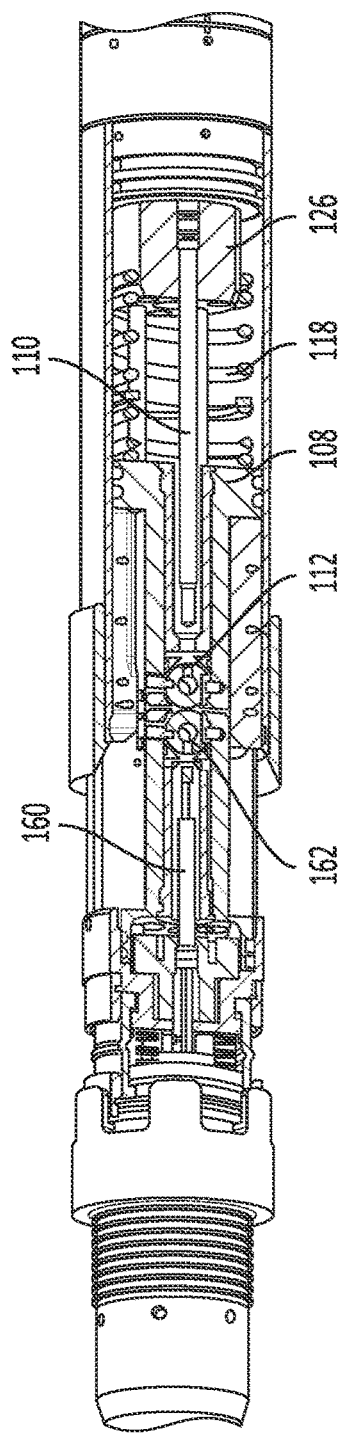
FIGS. 13C, 15C, 17C, and 19C depict isometric partial longitudinal cross-sectional views of the mating of a Christmas tree optical connector front assembly to a tubing hanger optical connector front assembly, according to one aspect of the present disclosure.

In FIG. 13C, the front face of the tubing hanger optical connector manifold is in contact with the front face of the Christmas tree optical connector manifold 108. The Christmas tree optical connector optical stem 110 is disposed within the Christmas tree optical connector insert, and the tubing hanger optical connector optical stem 160 is similarly disposed within the tubing hanger optical connector insert. Both the Christmas tree optical connector spherical seal assembly 112 and the tubing hanger optical connector spherical seal assembly 162 are in the closed position.

Figure 15C:
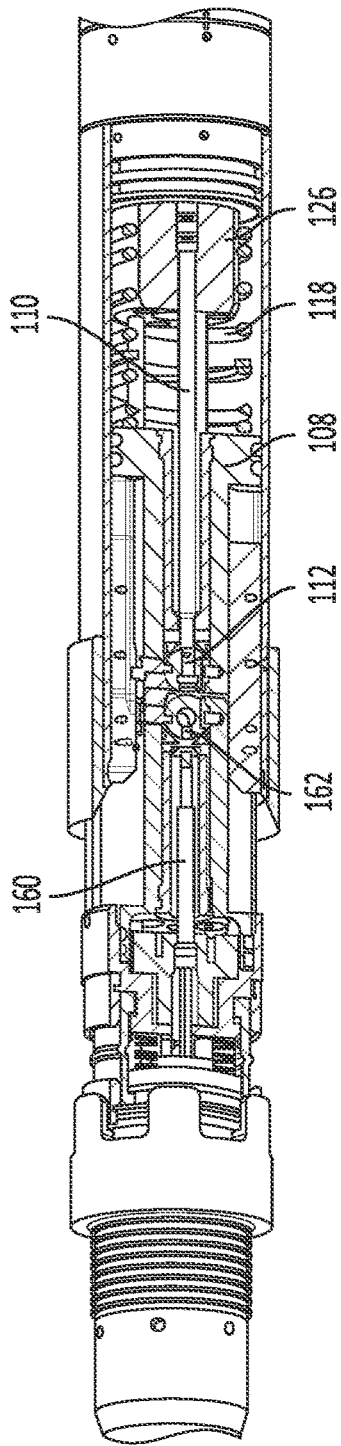

In FIG. 15C, the Christmas tree optical connector manifold 108 is sufficiently impelled in a proximal direction so that the Christmas tree optical connector actuator pin cam traverses a section of the guide rail to cause the Christmas tree optical connector spherical seal ball to rotate. In this manner, the Christmas tree optical connector spherical seal assembly 112 assumes an opened position. As the Christmas tree optical connector manifold is further compressed, the assembly of the Christmas tree optical connector optical stem 110 enters the Christmas thee spherical seal ball optical stem bore hole.

Figure 17C:
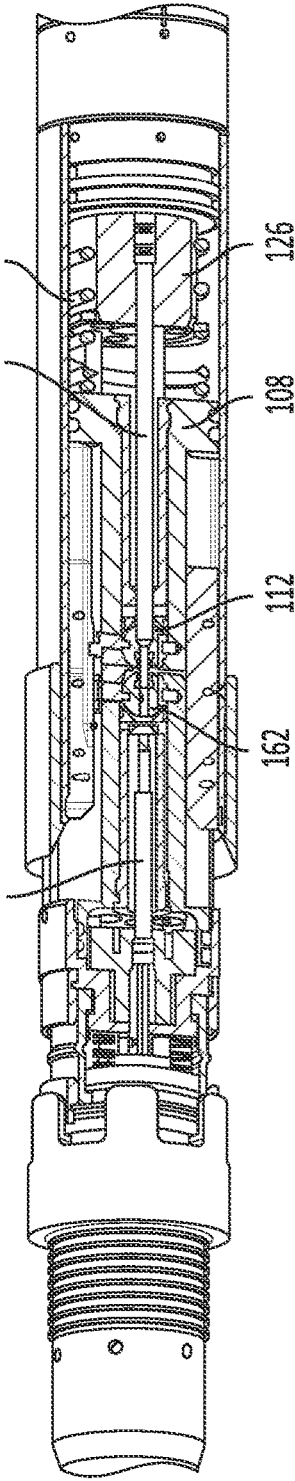

In FIG. 17C, the Christmas tree optical connector manifold 108 is sufficiently impelled in a proximal direction so that the tubing hanger optical connector actuator pin cam traverses the section of the guide rail to cause the tubing hanger optical connector spherical seal ball to rotate. In this manner, the tubing hanger optical connector spherical seal assembly 162 assumes an opened position. As the Christmas tree optical connector manifold is further compressed, the assembly of the Christmas tree optical connector optical stem 110 enters the tubing hanger optical connector spherical seal ball optical stem bore hole.

Figure 19C:
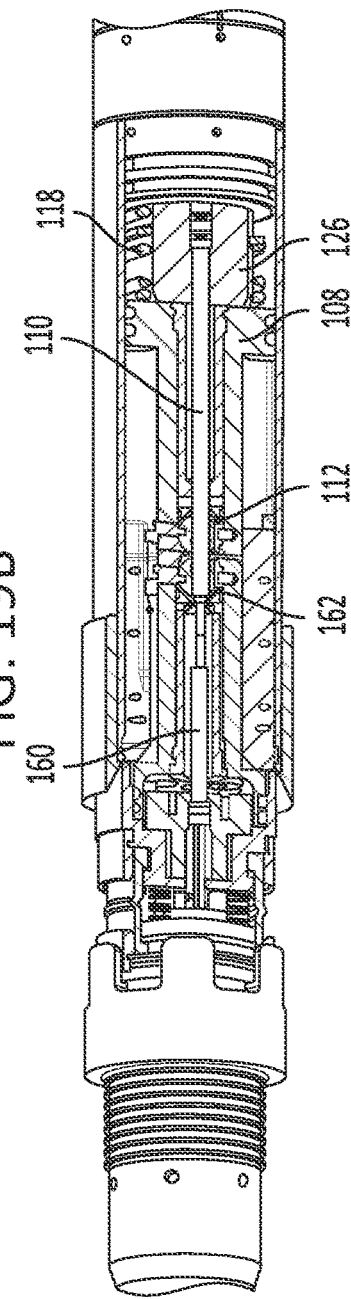

In FIG. 19C, the Christmas tree optical connector manifold 108 is impelled to its proximal-most position and is in contact with the distal face of the Christmas tree optical connector optical stem mount 126. Compression spring 118 is now in its most compressed position producing a maximum distal bias to the Christmas tree optical connector manifold 108. At this stage, the Christmas tree optical connector optical stem has fully penetrated both the Christmas tree optical connector spherical seal ball bore hole and the tubing hanger optical connector spherical seal ball bore hole. Additionally, the Christmas tree optical connector optical stem assembly makes full physical and optical contact with the equivalent feature of the tubing hanger optical connector optical stem 160. Because of the coupling of the assemblies of the Christmas tree optical connector optical stem 110 and the tubing hanger optical connector optical stem 160, optical data from the tubing hanger optical connector may be transmitted through the Christmas tree optical connector optical stem 110 for receipt at a distant facility.

Figure 16A:
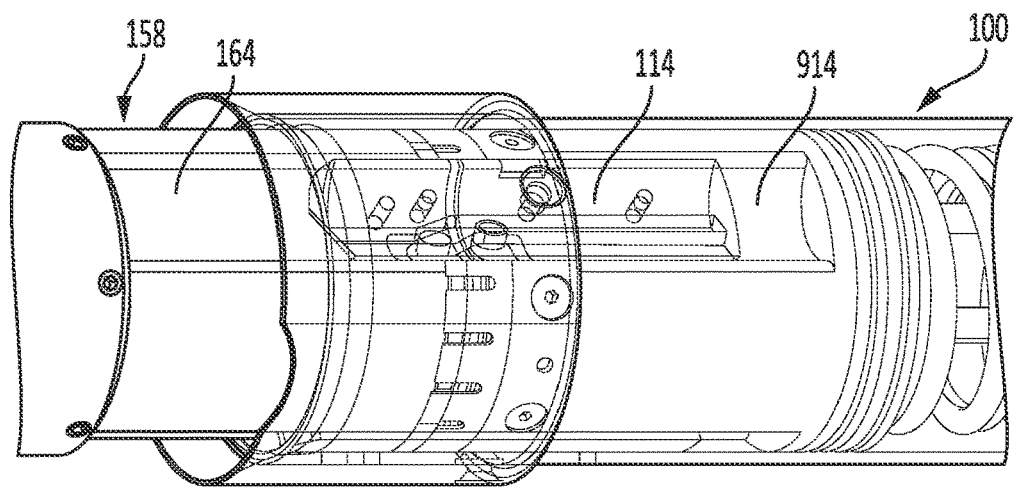
Figure 18A:
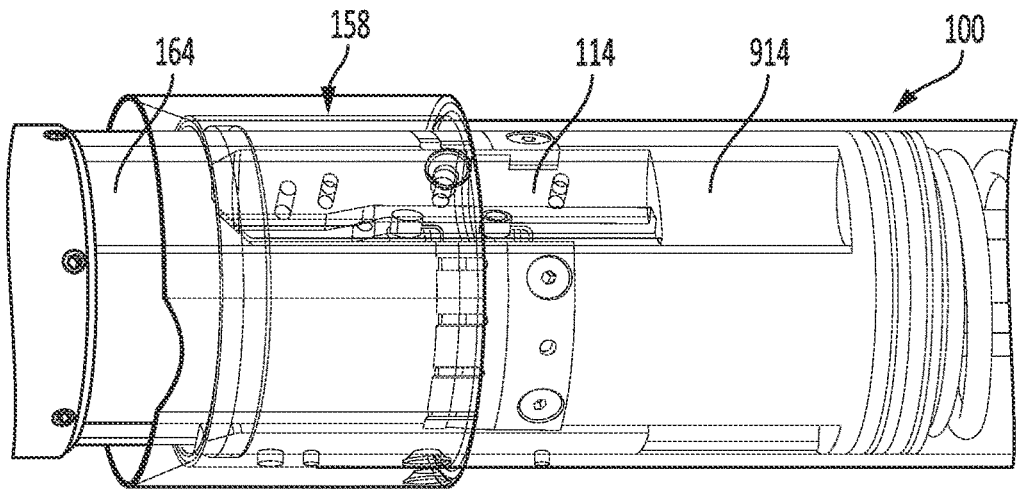
Figure 20A:
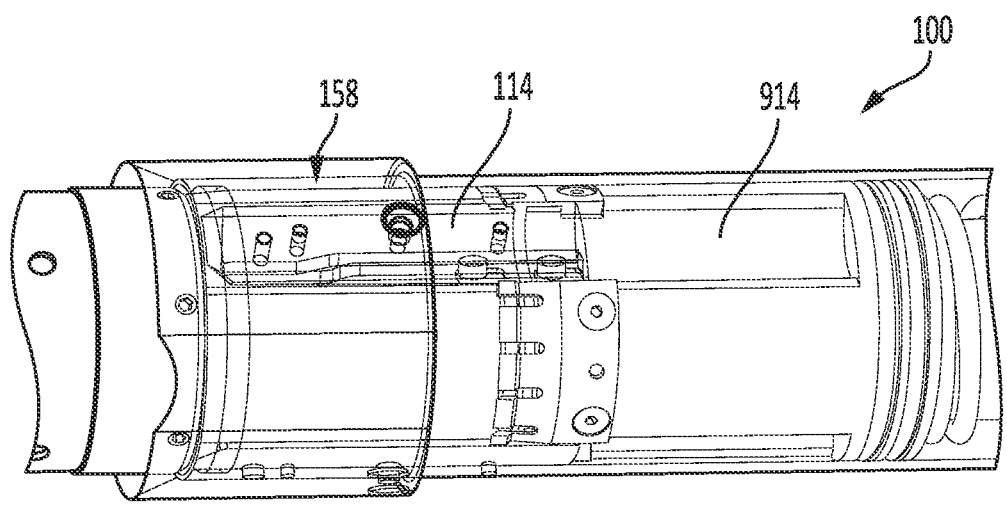

FIGS. 14A, 16A, 18A, and 20A depict close-up partial transparent views corresponding to the sequential steps in the mating procedure between a Christmas tree optical connector front assembly 100 and a tubing hanger optical connector front assembly. In particular, FIGS. 14A, 16A, 18A, and 20A focus on the slidable engagement of a tubing hanger optical connector guide rail interface 164 and a Christmas tree optical connector guide rail interface 914 with their equivalent Christmas tree optical connector guide rail 114. Thus, in FIG. 14A, the tubing hanger optical connector manifold 158 enters the Christmas tree optical connector shroud and a tubing hanger optical connector guide rail interface 164 engages a Christmas tree optical connector guide rail 114. The Christmas tree optical connector guide rail is already engaged with a Christmas tree optical connector guide rail interface 914. As the tubing hanger optical connector manifold is impelled into the Christmas tree optical connector shell assembly, as depicted in FIGS. 16A and 18A, the tubing hanger optical connector manifold 150 impels the Christmas tree optical connector manifold in a proximal direction by compressing the Christmas tree optical connector compression spring. As the tubing hanger optical connector guide rail interface 164 slides along a side of a Christmas tree optical connector guide rail 114, thereby increasing its engagement with the guide rail 114, the Christmas tree optical connector guide rail interface 914 is displaced in a proximal direction thus reducing its engagement with the guide rail 114. FIG. 20A illustrates the end of the mating procedure in which the tubing hanger optical connector manifold 158 is completely inserted into the Christmas tree optical connector shell, forcing the Christmas tree optical connector manifold to retract to its fully proximal position and fully compressing the Christmas tree optical connector compression spring.

FIGS. 14B, 16B, 18B, and 20B depict close-up partial transparent views corresponding to the sequential steps in the mating procedure between a Christmas tree optical connector front assembly and a tubing hanger optical connector front assembly. In particular, FIGS. 14B, 16B, 18B, and 20A focus on the engagement of the Christmas tree optical connector spherical seal actuator pin cam 929 and tubing hanger optical connector spherical seal actuator pin cam 1079 with the Christmas tree optical connector cam groove 214 fabricated in the Christmas tree optical connector guide rail 114. The Christmas tree optical connector cam groove 214, while a continuous structure, includes three domains. The first domain and the third domain are both linear, each having a longitudinal axis that is parallel to a longitudinal axis of the guide rail 114. The first domain and the third domain, however, are not co-axial. The second domain is a curved transition domain that joins a proximal end of the first domain with a distal end of the third domain.

Figure 14A:
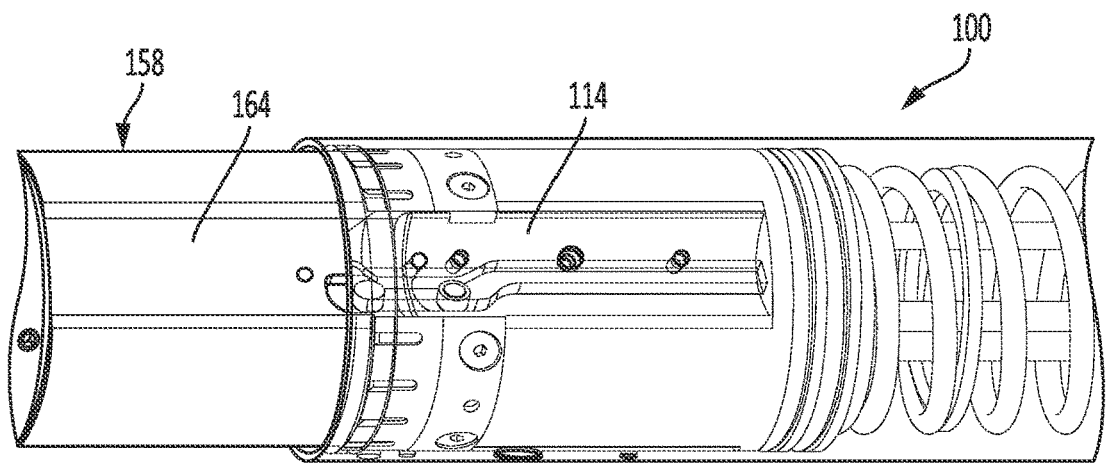
FIGS. 14A, 16A, 18A, and 20A depict close-up isometric partial transparent views of the mating of a Christmas tree optical connector front assembly to a tubing hanger optical connector front assembly, according to one aspect of the present disclosure.
Figure 14B:
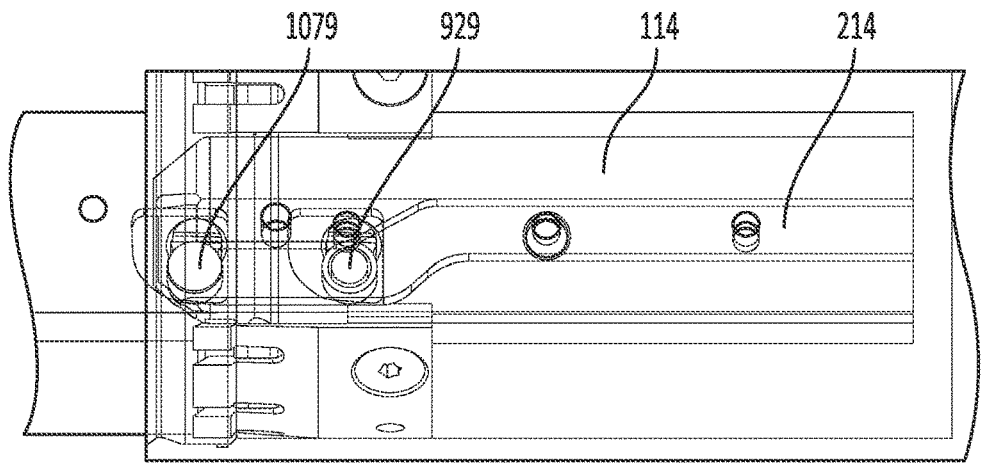
FIGS. 14B, 16B, 18B, and 20B depict close-up isometric partial transparent views of the engagement of a Christmas tree optical connector actuator pin cam and a tubing hanger optical connector actuator pin cam with a cam groove in a guide rail during a mating process, according to one aspect of the present disclosure.

In FIG. 14B, the Christmas tree optical connector actuator pin cam 929 is engaged at a proximal end of the first guide rail domain. Further, the tubing hanger optical connector manifold is sufficiently inserted into the Christmas tree optical connector front end that the tubing hanger optical connector actuator pin cam 1076 is also engaged with the guide rail 214 at a distal end. As the tubing hanger optical connector manifold is impelled into the Christmas tree optical connector shell, the Christmas tree optical connector actuator pin cam 929 and the tubing hanger optical connector actuator pin cam 1076 traverse the cam groove 214.

Figure 16B:
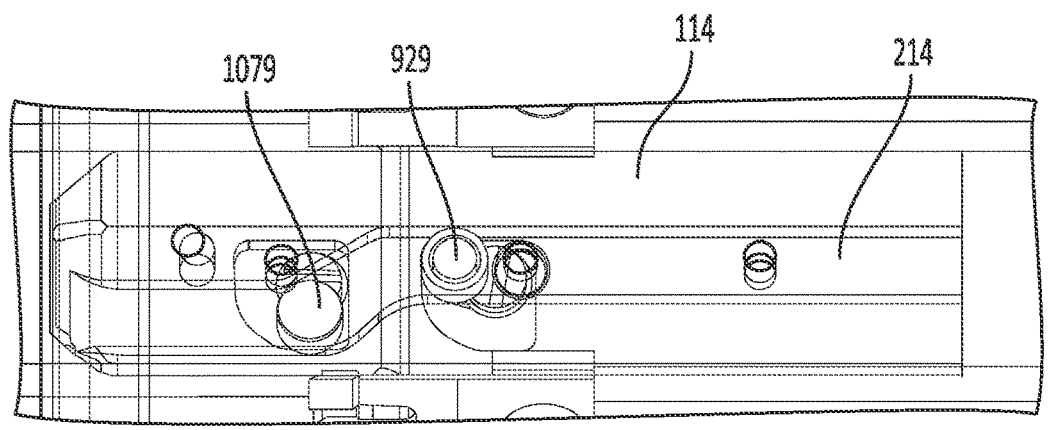

Thus, in FIG. 16B, the Christmas tree optical connector actuator pin cam 929 has traversed the second domain of the cam groove 214 into the distal end of the third domain of the cam groove 214. As the Christmas tree optical connector actuator pin cam 929 traverses the second domain of the cam groove 214, the spherical seal ball rotates about its axis so that the Christmas tree optical connector spherical seal assembly assumes an open position (see FIGS. 21A-D).

Figure 18B:
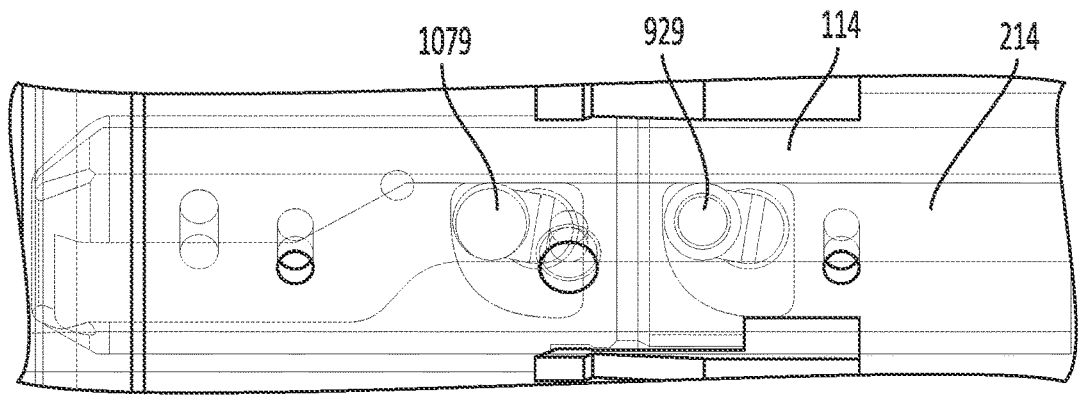

Further as illustrated in FIG. 16B, the tubing hanger optical connector actuator pin cam 1076 has traversed the cam groove 214 from the distal end of the first domain to the proximal end of the first domain. In FIG. 18B, the tubing hanger optical connector actuator pin cam 1076 has traversed the second domain of the cam groove 214 into the distal end of the third domain of the cam groove 214. As the tubing hanger optical connector actuator pin cam 1076 traverses the second domain of the cam groove 214, the spherical seal ball rotates about its axis so that the tubing hanger optical connector spherical seal assembly assumes an open position. The Christmas tree optical connector actuator pin cam 929 continues to traverse the third domain of the cam groove 214.

Figure 20B:
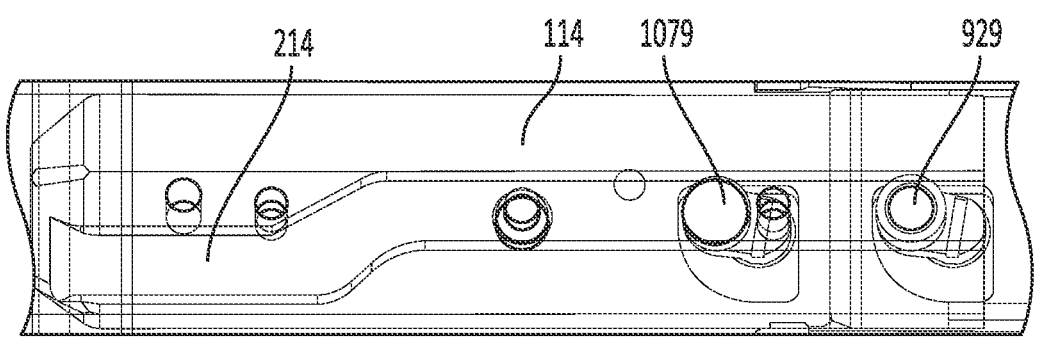

FIG. 20B illustrates the end of the mating procedure in which both of the Christmas tree optical connector actuator pin cam 929 and the tubing hanger optical connector actuator pin cam 1076 are located at a distal end of the cam groove 214. Both of the tubing hanger optical connector spherical seal assembly and the Christmas tree optical connector spherical seal assembly have been rotated into their respective open positions.

FIGS. 14C, 16C, 18C, and 20C depict cross-sectional close-up views corresponding to the sequential steps in the mating procedure between a Christmas tree optical connector front assembly and a tubing hanger optical connector front assembly. In particular, FIGS. 14C, 16C, 18C, and 20C focus on the opening sequences of the Christmas tree optical connector spherical seal assembly 112 and the tubing hanger optical connector spherical seal assembly 162 as the tubing hanger optical connector manifold impels the Christmas tree optical connector manifold 108 into the proximal section of the Christmas tree optical connector shell assembly shroud 106 and the shell assembly. These views are close-up views otherwise depicted in FIGS. 13C, 15C, 17C, and 19C, respectively.

Figure 14C:
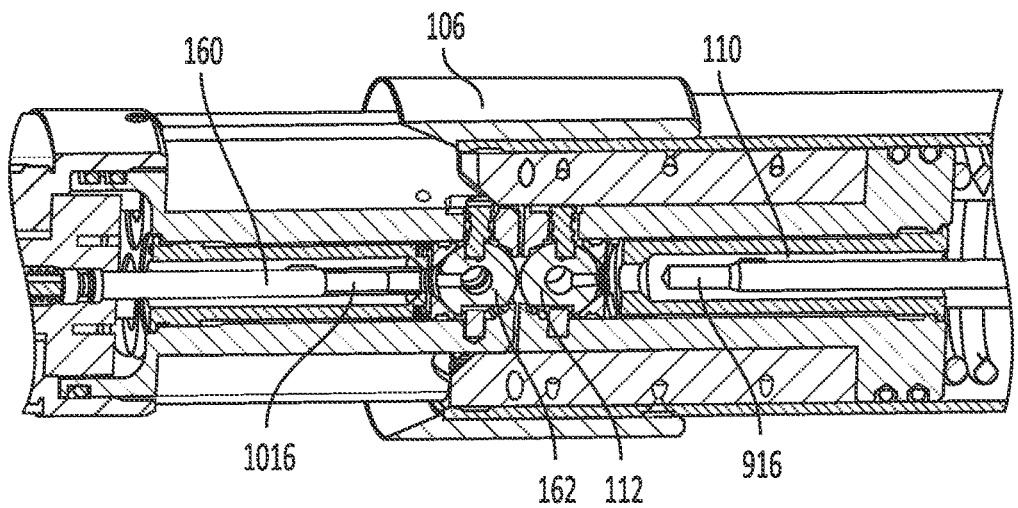
FIGS. 14C, 16C, 18C, and 20C depict longitudinal cross-sectional views of the rotation of a Christmas tree optical connector spherical seal assembly front assembly and the rotation of a tubing hanger optical connector spherical seal assembly front assembly during a mating process, according to one aspect of the present disclosure.

In FIG. 14C, the front face of the tubing hanger optical connector manifold is in contact with the front face of the Christmas tree optical connector manifold. The Christmas tree optical connector optical stem 110 is disposed within the Christmas tree optical connector insert, and the tubing hanger optical connector optical stem 160 is similarly disposed within the tubing hanger optical connector insert. Both the Christmas tree optical connector spherical seal assembly 112 and the tubing hanger optical connector spherical seal assembly 162 are in the closed position. Relative positions of the Christmas tree optical connector optical stem assembly 916 and the tubing hanger optical connector optical stem assembly 1016 are also depicted.

Figure 16C:
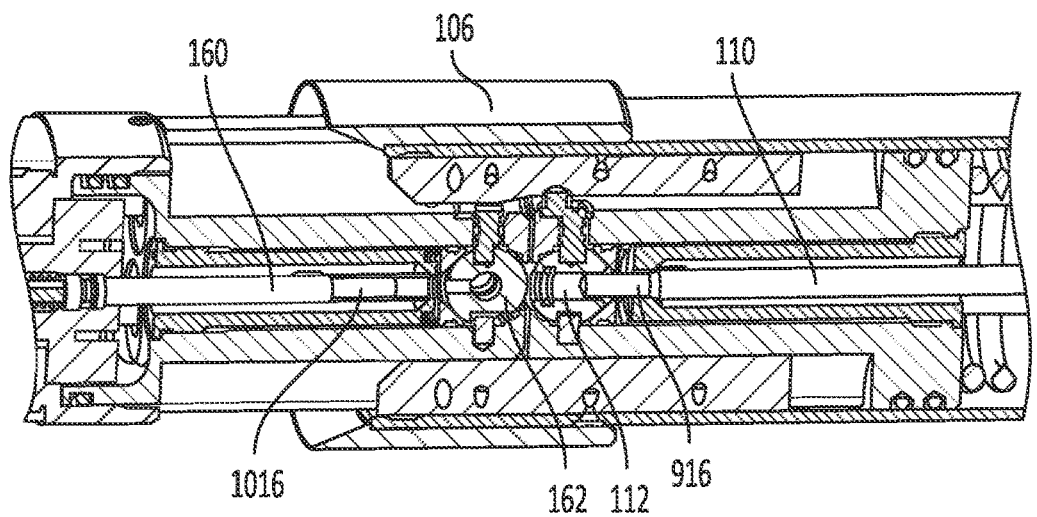

In FIG. 16C, the Christmas tree optical connector manifold 108 is sufficiently impelled in a proximal direction so that the Christmas tree optical connector actuator pin cam traverses a section of the guide rail to cause the spherical seal ball to rotate. In this manner, the Christmas tree optical connector spherical seal assembly 112 assumes an opened position. As the Christmas tree optical connector manifold is further compressed, the Christmas tree optical connector optical stem assembly 916 of the Christmas tree optical connector optical stem 110 enters the Christmas tree spherical seal ball optical stem bore hole.

Figure 18C:
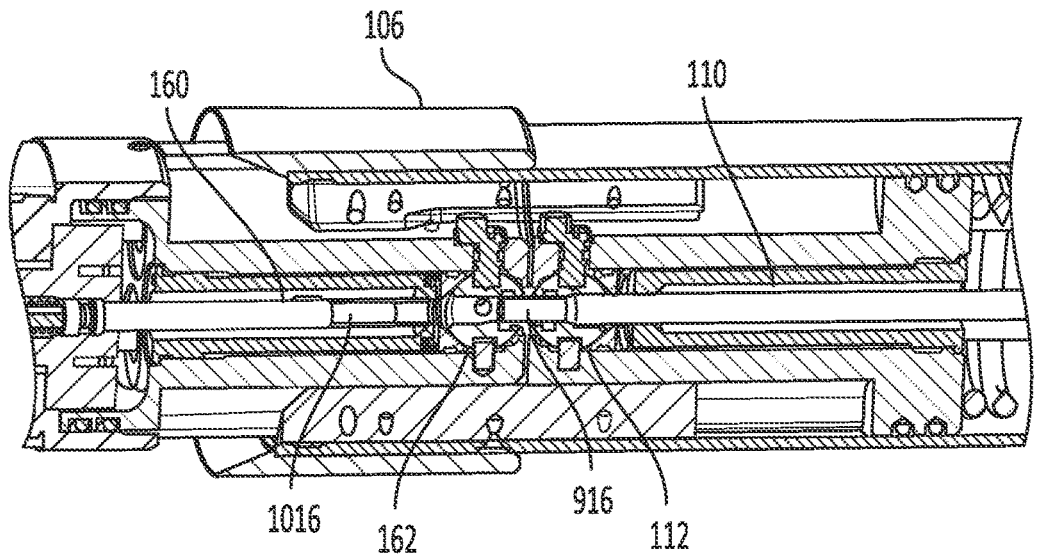

In FIG. 18C, the Christmas tree optical connector manifold 108 is sufficiently impelled in a proximal direction so that the tubing hanger optical connector actuator pin cam traverses the section of the guide rail to cause the spherical seal ball to rotate. In this manner, the tubing hanger optical connector spherical seal assembly 162 assumes an opened position. As the Christmas tree optical connector manifold is further compressed, the Christmas tree optical connector optical stem assembly 916 of the Christmas tree optical connector optical stem 110 enters the tubing hanger optical connector spherical seal ball optical stem bore hole.

Figure 20C:
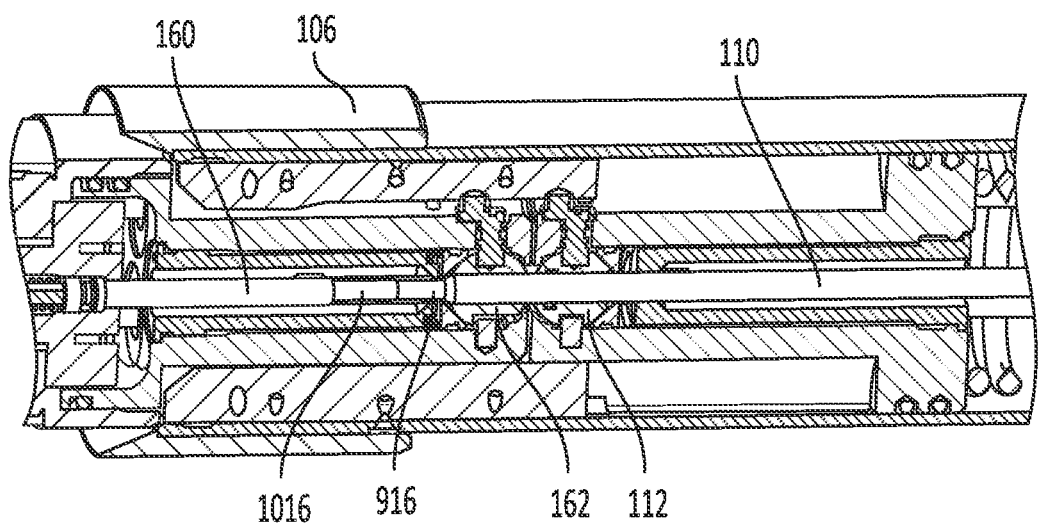

In FIG. 20C, the Christmas tree optical connector manifold 108 is impelled in to its proximal-most position and is in contact with the distal face of the Christmas tree optical connector optical stem mount. At this stage, the Christmas tree optical connector optical stem 110 has fully penetrated both the Christmas tree optical connector spherical seal ball bore hole and the tubing hanger optical connector spherical seal ball bore hole. In this manner, the Christmas tree optical connector optical stem assembly 916 makes full physical and optical contact with the equivalent feature of the tubing hanger optical connector optical stem assembly 1016. Optical data from the tubing hanger optical connector may be transmitted through the Christmas tree optical connector optical stem 110 for receipt at a distant facility once the optical coupling between the Christmas tree optical connector optical stem 110 and tubing hanger optical connector optical stem 160 is completed.

FIGS. 21A-D depict isometric views demonstrating the effect of traversal of a spherical seal ball actuator pin cam (for example Christmas tree optical connector spherical seal actuator pin cam 929) across a Christmas tree optical connector cam groove 214 fabricated in a Christmas tree optical connector guide rail 114. The Christmas tree optical connector cam groove 214 comprises three domains: a first domain 2110 at a distal end 2102 of the cam groove 214; a second domain 2120 disposed close to the distal end 2102 of the cam groove 214; and a third domain 2030 disposed toward a proximal 2104 end of the cam groove 214. The first domain 2110 and the third domain 2130 are both linear, each having a longitudinal axis that is parallel to a longitudinal axis of the guide rail 114. The first domain 2110 and the third domain 2130, however, are not co-axial. The second domain 2120 is a curved transition domain that joins a proximal end of the first domain 2110 with a distal end of the third domain 2130.

Figure 21A:
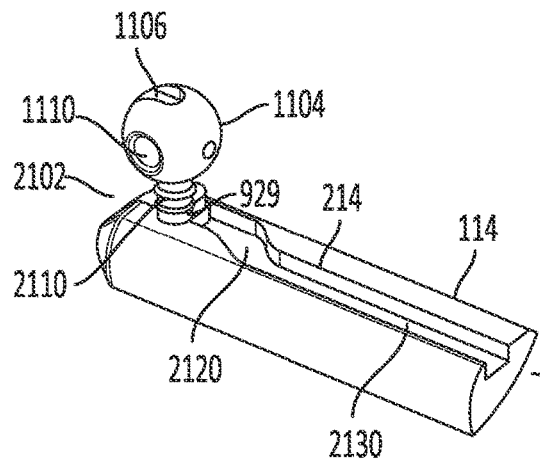
FIGS. 21A,B,C,D depict isometric views of the rotation of a spherical seal assembly during the traverse of the actuator pin cam in the cam groove during a mating process, according to one aspect of the present disclosure.

In FIG. 21A, the spherical seal ball is depicted at the distal end 2102 of the cam groove 214. The spherical seal ball is in a closed position, indicated by the position of the optical stem bore-hole 1110 being orthogonal to a longitudinal axis of the guide rail 114. It may be understood that linear axes of the optical stems are parallel to the longitudinal axis of the Christmas tree optical connector and tubing hanger optical connector shells. Because the longitudinal axis of a guide rail 114 is aligned with the longitudinal axis of the Christmas tree optical connector shell, the longitudinal axes of the optical stems are parallel to the longitudinal axis of the guide rail 114. In an open position, the spherical seal ball optical stem bore-hole axis must align with the axis of an optical stem. The spherical seal ball dowel pin interface 1106 is located opposite the interface holding the actuator pin. Thus, the dowel pin and the actuator pin form a rotational axis orthogonal to the axis defined by the optical stem bore-hole 1110.

Figure 21B:
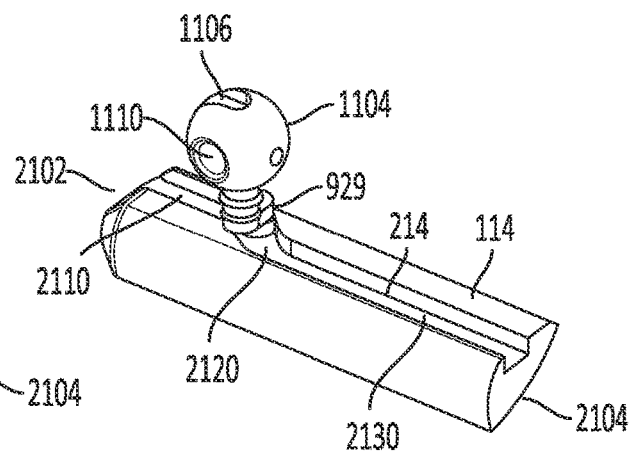
Figure 21C:
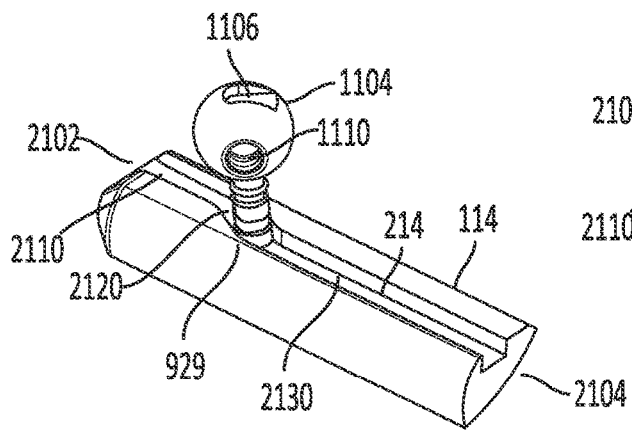
Figure 21D:
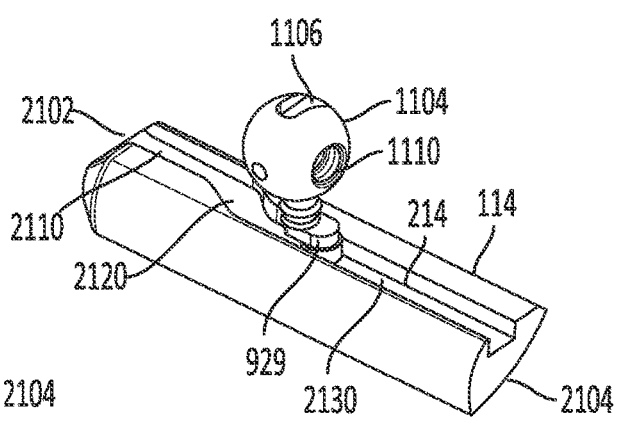

In FIG. 21B, the spherical seal ball is depicted at a proximal end of the first domain 2110. FIG. 21C illustrates the spherical seal ball assembly traversing the second domain 2120 (in a distal to proximal direction), permitting the seal ball to rotate about the actuator pin/dowel pin axis. FIG. 21D illustrates that, after traversing the second domain 2120 into the third domain 2130, the spherical seal ball assembly has entered into the open position. As illustrated in FIG. 21D, the open position is defined by the axis of the optical stem bore hole 1110 being parallel to the longitudinal axis of the guide rail 114.

It may be understood that a spherical seal ball assembly traversing from the proximal end 2104 of the cam groove 214 to the distal end 2102 of the cam groove will reverse the process. In such reversed process, the spherical seal ball assembly will transition from an open position to a closed position.

It may be further understood that a spherical seal ball assembly that include a rotatable cam bushing may have the spherical seal ball actuator pin cam bushing engage the cam groove 214 instead of the spherical seal ball actuator pin cam itself. Because the spherical seal ball actuator pin cam bushing is configured to rotate about the spherical seal ball actuator pin cam, the traversal of the spherical seal ball actuator pin along the length of the cam groove 214 may be smoother than that of a spherical seal ball actuator pin having a fixed cam.

In many of the descriptions above, singular terms are used to describe the various components of the connector portions and their interactions. Thus, a description may refer to "an" optical stem disposed in "an" insert and configured to slidably traverse "a" spherical seal ball optical bore hole. Additional descriptions may refer to "a" spherical seal assembly composed of "a" spherical seal ball having "a" dowel pin and "an" actuator pin including "an" attached cam. Further descriptions may include that "a" Christmas tree optical connector spherical seal ball and "a" tubing hanger optical connector spherical seal ball may each engage "a" cam groove fabricated in "a" Christmas tree optical connector guide rail. Such singular descriptions are merely provided for ease of presentation and do not disclaim that multiples of such assembled components may be included in either the Christmas tree optical connector front end or the tubing hanger optical connector front end. For example, isometric views of FIGS. 2, 8A,B, 9A,B,D, 10A,B, and 13 through 20 all depict Christmas tree optical connector front ends and tubing hanger optical connector front ends having three symmetrically disposed sets of optical stems, inserts, Christmas tree optical connector guide rails, spherical seal assemblies, guide rail interfaces, and other components. However, it should also be recognized that despite the several examples of three-fold multiples of such components, that Christmas tree optical connector and tubing hanger optical connector front ends may be composed of any integer number of such component assemblies including, one, two, three, four, or any additional number as can be fabricated in a Christmas tree optical connector front end or a tubing hanger optical connector front end.

It is worthy to note that any reference to "one aspect" or "an aspect" means that a particular feature, structure, or characteristic described in connection with the aspect is included in at least one aspect. Thus, appearances of the phrases "in one aspect" or "in an aspect" in various places throughout the specification are not necessarily all referring to the same aspect. Furthermore, the particular features, structures or characteristics may be combined in any suitable manner in one or more aspects.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various aspects have been described herein, many modifications, variations, substitutions, changes, and equivalents to those aspects may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed aspects. The following claims are intended to cover all such modification and variations.

In summary, numerous benefits have been described which result from employing the concepts described herein. The foregoing description of the one or more aspects has been presented for purposes of illustration and description. It is not intended to be exhaustive or limiting to the precise form disclosed. Modifications or variations are possible in light of the above teachings. The one or more aspects were chosen and described in order to illustrate principles and practical application to thereby enable one of ordinary skill in the art to utilize the various aspects and with various modifications as are suited to the particular use contemplated. It is intended that the claims submitted herewith define the overall scope.

Various aspects of the present disclosure may be described in accordance with one or more of the following examples.

Example 1. A connector assembly, comprising:
  a first releasable and mateable connector, comprising:
    a first front assembly, comprising:
      a shell assembly;
      a shroud disposed at a distal end of the shell assembly;
      a first manifold disposed within an interior of the shell assembly, comprising:
        a plurality of first inserts; and
        a plurality of first spherical seal assemblies, wherein each of the plurality of first spherical seal assemblies comprises:
          a first spherical seal ball;
          a first spherical seal ball dowel pin;
          a first spherical seal ball actuator pin; and
          a first actuator pin cam in mechanical communication with the spherical seal ball actuator pin;
      a plurality of first optical stems disposed within the interior of the shell assembly, wherein a proximal end of each of the plurality of first optical stems is fixed within an optical stem mount, and a distal end of each of the plurality of first optical stems is slidably engaged within one of the plurality of first inserts;
      a plurality of guide rails, wherein each of the plurality of guide rails comprises a cam groove;
      a compression spring disposed within the shell assembly in mechanical communication with a distal end of the first manifold and a proximal end of the optical stem mount; and
      a first front face in mechanical communication with a distal face of the first manifold;
  a second releasable and mateable connector, comprising:
    a second front assembly, comprising:
      a second manifold in mechanical communication with a center housing, the second manifold comprising:
        a plurality of second inserts;
        a plurality of guide rail interfaces; and a plurality of second spherical seal assemblies, wherein each of the plurality of second spherical seal assemblies comprises:
a second spherical seal ball;
a second spherical seal ball dowel pin;
a second spherical seal ball actuator pin; and
a second actuator pin cam in mechanical communication with the spherical seal ball actuator pin; and
a plurality of second optical stems, wherein a distal end of each of the plurality of second optical stems is fixed within one of the plurality of second inserts,
wherein each of the first spherical seal balls of the plurality of first spherical seal assemblies is configured to rotate about a first axis defined by the first spherical seal ball dowel pin and the first spherical seal ball actuator pin when the first actuator pin cam traverses the cam groove of one of the plurality of guide rails; and
wherein each of the second spherical seal balls of the plurality of second spherical seal assemblies is configured to rotate about a second axis defined by the second spherical seal ball dowel pin and the second spherical seal ball actuator pin when the second actuator pin cam traverses the cam groove of the one of the plurality of guide rails.

Example 2. The connector assembly of Example 1, further comprising:
a latch collet in mechanical communication with an exterior distal edge of the first manifold; and
a latch collet interface dispose on an exterior distal edge of the second manifold,
wherein the latch collet interface is configured to receive a plurality of latch collet teeth when the first releasable and mateable connector is mated with the second releasable and mateable connector.

Example 3. The connector assembly of any one or more of Examples 1 through 2, wherein the second manifold comprises:
a check valve face disposed on a distal face of the second manifold;
a check valve conduit in fluid communication with the check valve face;
a check valve ball disposed within the check valve conduit; and
a check valve spring in mechanical communication with the check valve ball.

Example 4. The connector assembly of Example 3, wherein the first front face comprises:
a plurality of optical stem pass-through holes;
a check valve access; and
a plurality of flushing channels, wherein each of the plurality of flushing channels is configured to connect one of the plurality of optical stem pass-through holes and the check valve access, and
wherein the check valve access is disposed opposite to the check valve face when the first releasable and mateable connector is mated with the second releasable and mateable connector.

Example 5. The connector assembly of Example 4, further comprising an amount of fluid disposed within the interior of the shell assembly, wherein the amount fluid is configured to flow from the interior of the shell assembly through the plurality of optical stem pass-through holes, through the check valve access into the check valve when the first releasable and mateable connector is mated with the second releasable and mateable connector.

Example 6. The connector assembly of Example 5, wherein the first manifold further comprises a compensating fluid port, configured to permit the amount of fluid to be introduced into the interior of the shell assembly.

Example 7. The connector assembly of any one or more of Example 1 through Example 6, wherein a proximal end of the second front assembly is in mechanical communication with a distal end of a misalignment compliance assembly.

Example 8. The connector assembly of Example 7, wherein the misalignment compliance assembly comprises:
an optical stem retaining plate in mechanical communication with the center housing;
a misalignment back housing;
a misalignment compliance spring disposed between a distal edge of the misalignment back housing and a proximal edge of the center housing; and
a misalignment outer bladder connected to the misalignment back housing at a proximal end and to the center housing at a distal end,
wherein the misalignment outer bladder is disposed to cover the misalignment compliance spring and protect it from an outside environment.

Example 9. The connector assembly of Example 8, wherein the optical stem retaining plate is fastened to the misalignment back housing via a plurality of shoulder bolts,
wherein each of the plurality of shoulder bolts is disposed in one of a plurality of shoulder bolt bores formed in the optical stem retaining plate, and
wherein each of the plurality of shoulder bolt bores has a wider diameter than each of the plurality of shoulder bolts.

Example 10. The connector assembly of any one or more of Example 1 through Example 9, wherein
each of the plurality of first spherical seal assemblies further comprises:
a first spherical seal ball dowel pin interface, configured to receive the first spherical seal ball dowel pin;
a first spherical seal ball actuator pin interface, configured to receive the first spherical seal ball actuator pin;
a first top seal disposed over a distal end of the first spherical seal ball;
a first bottom seat to receive the first spherical seal ball; and
a first bottom seal seat spring; and
each of the plurality of second spherical seal assemblies further comprises:
a second spherical seal ball dowel pin interface, configured to receive the second spherical seal ball dowel pin;
a second spherical seal ball actuator pin interface, configured to receive the second spherical seal ball actuator pin;
a second top seal disposed over a distal end of the second spherical seal ball;
a second bottom seat to receive the second spherical seal ball; and
a second bottom seal seat spring.

Example 11. The connector assembly of Example 10, wherein
each of the plurality of first spherical seal balls further comprises:
a first optical stem bore hole disposed along an axis orthogonal to an axis defined by the first spherical seal ball dowel pin and the first spherical ball actuator pin; and
a first optical stem seal disposed at an end of the first optical stem bore hole; and
each of the plurality of second spherical seal balls further comprises:

a second optical stem bore hole disposed along an axis orthogonal to an axis defined by the second spherical seal ball dowel pin and the second spherical ball actuator pin; and a second optical stem seal disposed at an end of the second optical stem bore hole.

Example 12. A method of mating a first releasable and mateable connector and a second releasable and mateable connector, the method comprising:

juxtaposing a first manifold of the first connector proximate to a second manifold of the second connector;

inserting the second manifold of the second connector into a shroud of the first connector;

contacting the first manifold with the second manifold;

contacting a plurality of teeth of a latch collet of the first connector with a latch collet interface disposed in the second manifold of the second connector;

impelling the second manifold against the first manifold, thereby displacing the first manifold in a proximal direction into a shell of the first connector;

rotating each of a first plurality of spherical seals disposed in the first manifold, thereby permitting each of a first plurality of optical stem assemblies to travers each of a plurality of first spherical seal ball optical stem bore holes;

rotating each of a second plurality of spherical seals disposed in the second manifold, thereby permitting each of a first plurality of optical stem assemblies to travers each of a plurality of second spherical seal ball optical stem bore holes; and contacting each of the plurality of first optical stem assemblies with each of a plurality of second optical stem assemblies.

Example 13. The method of Example 12, wherein rotating each of a first plurality of spherical seals comprises:

impelling each of a plurality of first spherical seal actuator pin cams in physical communication with each of a plurality of first spherical seal actuator pins to traverse a cam groove disposed in each of a plurality of guide rails disposed in a shell of the first connector.

Example 14. The method of any one or more of Example 12 through Example 13, wherein rotating each of a second plurality of spherical seals comprises:

impelling each of a plurality of second spherical seal actuator pin cams in physical communication with each of a plurality of second spherical seal actuator pins to traverse the cam groove disposed in each of the plurality of guide rails disposed in a shell of the first connector.

Example 15. The method of any one or more of Example 12 through Example 14, wherein rotating each of the first plurality of spherical seals occurs prior to rotating each of the second plurality of spherical seals.

Example 16. The method of any one or more of Example 12 through Example 15, wherein rotating each of the first plurality of spherical seals comprises rotating each of a first plurality of spherical seal balls around a first rotational axis defined by a first actuator pin and a first dowel pin, and wherein rotating each of the second plurality of spherical seals comprises rotating each of a second plurality of spherical seal balls around a second rotational axis defined by a second actuator pin and a second dowel pin.

Example 17. The method of any one or more of Example 12 through Example 16, further comprising:

extruding an amount of fluid from an interior of the shell of the first connector through the plurality of first spherical seal ball optical stem bore holes into a space between a first face of the first connector and a second face of the second connector;

impelling the amount of fluid from the space between the first face of the first connector and the second face of the second connector into a check valve disposed in the second manifold; and venting the amount of fluid through a check valve outlet into a guide rail interface disposed in the second manifold, thereby removing debris disposed win the space between the first face of the first connector and the second face of the second connector.

Example 18. The method of any one or more of Example 12 through Example 17, further comprising inserting each of a plurality of guide rails disposed in a shell of the first connector into each of a plurality of guide rail interfaces disposed in the second manifold.

What is claimed is:

1. A connector assembly, comprising:
   a first releasable and mateable connector, comprising:
      a first front assembly, comprising:
         a shell assembly;
         a shroud disposed at a distal end of the shell assembly;
         a first manifold disposed within an interior of the shell assembly, comprising:
            a plurality of first inserts; and
            a plurality of first spherical seal assemblies, wherein each of the plurality of first spherical seal assemblies comprises:
               a first spherical seal ball;
               a first spherical seal ball dowel pin;
               a first spherical seal ball actuator pin; and
               a first actuator pin cam in mechanical communication with the spherical seal ball actuator pin;
         a plurality of first optical stems disposed within the interior of the shell assembly, wherein a proximal end of each of the plurality of first optical stems is fixed within an optical stem mount, and a distal end of each of the plurality of first optical stems is slidably engaged within one of the plurality of first inserts;
         a plurality of guide rails, wherein each of the plurality of guide rails comprises a cam groove;
         a compression spring disposed within the shell assembly in mechanical communication with a distal end of the first manifold and a proximal end of the optical stem mount; and
         a first front face in mechanical communication with a distal face of the first manifold;
   a second releasable and mateable connector, comprising:
      a second front assembly, comprising:
         a second manifold in mechanical communication with a center housing, the second manifold comprising:
            a plurality of second inserts;
            a plurality of guide rail interfaces; and
            a plurality of second spherical seal assemblies, wherein each of the plurality of second spherical seal assemblies comprises:
               a second spherical seal ball;
               a second spherical seal ball dowel pin;
               a second spherical seal ball actuator pin; and
               a second actuator pin cam in mechanical communication with the spherical seal ball actuator pin; and a plurality of second optical stems, wherein a distal end of each of the plurality of second optical stems is fixed within one of the plurality of second inserts, wherein each of the first spherical seal balls of the plurality of first spherical seal assemblies is configured to rotate about a first axis defined by the first spherical seal ball dowel pin and the first spherical seal ball actuator pin when the first actuator pin cam traverses the cam groove of one of the plurality of guide rails; and wherein each of the second spherical seal balls of the plurality of second spherical seal assemblies is configured to rotate about a second axis defined by the second spherical seal ball dowel pin and the second spherical seal ball actuator pin when the second actuator pin cam traverses the cam groove of the one of the plurality of guide rails.

2. The connector assembly of claim 1, further comprising:
a latch collet in mechanical communication with an exterior distal edge of the first manifold; and
a latch collet interface dispose on an exterior distal edge of the second manifold,
wherein the latch collet interface is configured to receive a plurality of latch collet teeth when the first releasable and mateable connector is mated with the second releasable and mateable connector.

3. The connector assembly of claim 1, wherein the second manifold comprises:
a check valve face disposed on a distal face of the second manifold;
a check valve conduit in fluid communication with the check valve face;
a check valve ball disposed within the check valve conduit; and
a check valve spring in mechanical communication with the check valve ball.

4. The connector assembly of claim 3, wherein the first front face comprises:
a plurality of optical stem pass-through holes;
a check valve access; and
a plurality of flushing channels, wherein each of the plurality of flushing channels is configured to connect one of the plurality of optical stem pass-through holes and the check valve access, and
wherein the check valve access is disposed opposite to the check valve face when the first releasable and mateable connector is mated with the second releasable and mateable connector.

5. The connector assembly of claim 4, further comprising an amount of fluid disposed within the interior of the shell assembly, wherein the amount fluid is configured to flow from the interior of the shell assembly through the plurality of optical stem pass-through holes, through the check valve access into the check valve when the first releasable and mateable connector is mated with the second releasable and mateable connector.

6. The connector assembly of claim 5, wherein the first manifold further comprises a compensating fluid port, configured to permit the amount of fluid to be introduced into the interior of the shell assembly.

7. The connector assembly of claim 1, wherein a proximal end of the second front assembly is in mechanical communication with a distal end of a misalignment compliance assembly.

8. The connector assembly of claim 7, wherein the misalignment compliance assembly comprises:

an optical stem retaining plate in mechanical communication with the center housing;
a misalignment back housing;
a misalignment compliance spring disposed between a distal edge of the misalignment back housing and a proximal edge of the center housing; and
a misalignment outer bladder connected to the misalignment back housing at a proximal end and to the center housing at a distal end,
wherein the misalignment outer bladder is disposed to cover the misalignment compliance spring and protect it from an outside environment.

9. The connector assembly of claim 8, wherein the optical stem retaining plate is fastened to the misalignment back housing via a plurality of shoulder bolts,
wherein each of the plurality of shoulder bolts is disposed in one of a plurality of shoulder bolt bores formed in the optical stem retaining plate, and
wherein each of the plurality of shoulder bolt bores has a wider diameter than each of the plurality of shoulder bolts.

10. The connector assembly of claim 1, wherein
each of the plurality of first spherical seal assemblies further comprises:
a first spherical seal ball dowel pin interface, configured to receive the first spherical seal ball dowel pin;
a first spherical seal ball actuator pin interface, configured to receive the first spherical seal ball actuator pin;
a first top seal disposed over a distal end of the first spherical seal ball;
a first bottom seat to receive the first spherical seal ball; and
a first bottom seal seat spring; and
each of the plurality of second spherical seal assemblies further comprises:
a second spherical seal ball dowel pin interface, configured to receive the second spherical seal ball dowel pin;
a second spherical seal ball actuator pin interface, configured to receive the second spherical seal ball actuator pin;
a second top seal disposed over a distal end of the second spherical seal ball;
a second bottom seat to receive the second spherical seal ball; and
a second bottom seal seat spring.

11. The connector assembly of claim 10, wherein
each of the plurality of first spherical seal balls further comprises:
a first optical stem bore hole disposed along an axis orthogonal to an axis defined by the first spherical seal ball dowel pin and the first spherical ball actuator pin; and
a first optical stem seal disposed at an end of the first optical stem bore hole; and
each of the plurality of second spherical seal balls further comprises:
a second optical stem bore hole disposed along an axis orthogonal to an axis defined by the second spherical seal ball dowel pin and the second spherical ball actuator pin; and
a second optical stem seal disposed at an end of the second optical stem bore hole.

12. A method of mating a first releasable and mateable connector and a second releasable and mateable connector, the method comprising:

juxtaposing a first manifold of the first connector proximate to a second manifold of the second connector;

inserting the second manifold of the second connector into a shroud of the first connector;

contacting the first manifold with the second manifold;

contacting a plurality of teeth of a latch collet of the first connector with a latch collet interface disposed in the second manifold of the second connector;

impelling the second manifold against the first manifold, thereby displacing the first manifold in a proximal direction into a shell of the first connector;

rotating each of a first plurality of spherical seals disposed in the first manifold, thereby permitting each of a first plurality of optical stem assemblies to travers each of a plurality of first spherical seal ball optical stem bore holes;

rotating each of a second plurality of spherical seals disposed in the second manifold, thereby permitting each of a first plurality of optical stem assemblies to travers each of a plurality of second spherical seal ball optical stem bore holes; and contacting each of the plurality of first optical stem assemblies with each of a plurality of second optical stem assemblies.

13. The method of claim 12, wherein rotating each of a first plurality of spherical seals comprises:

impelling each of a plurality of first spherical seal actuator pin cams in physical communication with each of a plurality of first spherical seal actuator pins to traverse a cam groove disposed in each of a plurality of guide rails disposed in a shell of the first connector.

14. The method of claim 12, wherein rotating each of a second plurality of spherical seals comprises:

impelling each of a plurality of second spherical seal actuator pin cams in physical communication with each of a plurality of second spherical seal actuator pins to traverse the cam groove disposed in each of the plurality of guide rails disposed in a shell of the first connector.

15. The method of claim 12, wherein rotating each of the first plurality of spherical seals occurs prior to rotating each of the second plurality of spherical seals.

16. The method of claim 12, wherein rotating each of the first plurality of spherical seals comprises rotating each of a first plurality of spherical seal balls around a first rotational axis defined by a first actuator pin and a first dowel pin, and wherein rotating each of the second plurality of spherical seals comprises rotating each of a second plurality of spherical seal balls around a second rotational axis defined by a second actuator pin and a second dowel pin.

17. The method of claim 12, further comprising:

extruding an amount of fluid from an interior of the shell of the first connector through the plurality of first spherical seal ball optical stem bore holes into a space between a first face of the first connector and a second face of the second connector;

impelling the amount of fluid from the space between the first face of the first connector and the second face of the second connector into a check valve disposed in the second manifold; and venting the amount of fluid through a check valve outlet into a guide rail interface disposed in the second manifold, thereby removing debris disposed win the space between the first face of the first connector and the second face of the second connector.

18. The method of claim 12, further comprising inserting each of a plurality of guide rails disposed in a shell of the first connector into each of a plurality of guide rail interfaces disposed in the second manifold.

* * * * *